(12) United States Patent
Redlich

(10) Patent No.: US 8,145,526 B2
(45) Date of Patent: Mar. 27, 2012

(54) REVENUE SHARING SYSTEM THAT INCENTIVIZES CONTENT PROVIDERS AND REGISTERED USERS AND INCLUDES PAYMENT PROCESSING

(76) Inventor: Daniel Redlich, Miami Beach, FL (US)

(*) Notice: Subject to any disclaimer, the term of this patent is extended or adjusted under 35 U.S.C. 154(b) by 526 days.

(21) Appl. No.: 12/486,863

(22) Filed: Jun. 18, 2009

(65) Prior Publication Data

US 2009/0327057 A1 Dec. 31, 2009

Related U.S. Application Data

(63) Continuation-in-part of application No. 12/274,668, filed on Nov. 20, 2008.

(60) Provisional application No. 60/989,183, filed on Nov. 20, 2007.

(51) Int. Cl.
*G06Q 30/00* (2012.01)
(52) U.S. Cl. ................................... 705/14.46; 705/14.7
(58) Field of Classification Search ............... 705/14.46, 705/14.7
See application file for complete search history.

(56) References Cited

U.S. PATENT DOCUMENTS

2008/0109306 A1* 5/2008 Maigret et al. .................. 705/14

OTHER PUBLICATIONS

Capazoo Launches New Social Life Networking and Entertainment Website that Transcends the Virtual.; PR Newswire; Oct. 22, 2007. Author unknown.*

* cited by examiner

*Primary Examiner* — John Weiss
*Assistant Examiner* — Michael Stibley
(74) *Attorney, Agent, or Firm* — Robert C. Kain, Jr.

(57) ABSTRACT

The computer-based method and system shares revenue with a content provider and registered users. A web page has supplied electronic content and ads with displays and hyperlinks to a corresponding advertiser designated web site. Associated sales referral fees are tracked based upon user click throughs. The content provider is incentivized because the system shares the associated sales referral fees with him based upon factors such as frequency of posting content, quality rankings by users, gross value referral fees, and page user-visitors. Registered user-visitors are incentivized by providing each with N quality ranking tokens and by sharing the referral fees with users who post tokens on content. The QA ranking formula accounts for the quantity of posted tokens, the sequential order of posting, the number of user-visitors, and the referral fee to the content provider. The fees are paid to debit card, credit card, or cell phone account payment processors.

34 Claims, 14 Drawing Sheets

FIG.10 Double Relevancy System & Program 300

FIG. 14

|  | Account Maintenance Pgm |  |
|---|---|---|
| Action | Effect on Content (Cnt.) | Account Process |
| User - Content Provider registers | Upload Content; initiate auto upload of content from 3$^{rd}$ party site(s); Sys. stores upload approve key - token | Initialize payment account and payment processor |
| 3$^{rd}$ Party Site | Automatic upload of content from 3$^{rd}$ party site | -nil- |
| System (sys.) | Post Content with relevant ads | Increment (incr.) Cnt. Provider profile |
| Other Users or Other Cnt. Providers | View; post links; assign QA rank to cnt.; Cnt. Providers post comments | Incr. Cnt. Providers profile; incr. QA Voter profile |
| System | Accumulate click-thru ad $ + sales comm'n $ | Sys. update Cnt. Provider Earnings Table (earn tbl.); update Referrer earn tbl.; update QA Voter earn tbl. |
| Sys. - Cnt. Provider acct.; Referrer acct., QA Voter acct. exceeds acct threshold | email or other notice to Cnt. Provider, etc. | Sys. transfers $ to id'd pmt. processor |
| System | -nil- | Reset Cnt Provider acct. value and other acct values |

REVENUE SHARING SYSTEM THAT INCENTIVIZES CONTENT PROVIDERS AND REGISTERED USERS AND INCLUDES PAYMENT PROCESSING

The present application is a continuation-in-part patent application of regular patent application Ser. No. 12/274,668 filed Nov. 20, 2008, now pending, which claimed priority from and the benefit of earlier filed provisional patent application Ser. No. 60/989,183 filed Nov. 20, 2007, the contents of both referenced applications being incorporated herein by reference thereto.

The present invention relates to an Internet based system and computer method which shares revenue between content providers and registered users and further incentivizes those content providers and registered users by sharing click-through revenue and permitting financial transfers to users and providers via designated payment processor(s). A computer based method is also disclosed as is an information processing system and programming instructions stored on computer readable medium.

BACKGROUND OF THE INVENTION

With a variety of software tools, users can easily upload content and post that content on the Internet. Examples of content include text entries, such as documents and written textual materials, for example, materials posted on various blogs, video content such as user supplied content on Google videos, YouTube and MySpace, and photos taken by users uploaded to Flickr, Face book and others. Unfortunately, this user generated content is oftentimes provided free of charge to the web site or system operators. These web site operators place ads next to the user supplied content and receive sales referral fees based thereon. The users who created the content do not monetary benefit from the distribution and display of such content. Further, some Internet platforms do not accept all types of user generated content.

In general, many of these systems, which enable a user to post user generated content, do not renumerate the user content provider in any manner, such as sharing ad revenue derived from other visitors seeing the user supplied content and then clicking through to advertiser designated web sites to purchase goods or services thereon.

OBJECTS OF THE INVENTION

It is an object of the invention to provide a single, simple Internet platform server system which is user friendly and which enables a user to easily post his or her user generated content including text, electronic images or pictures, video, audio or other user created electronic content and incentivize the content provider by monetizing the content with ads and then sharing the ad revenue.

It is a further object of the present invention to provide the user with some type of monetary renumeration if the uploaded content is interesting and generates additional traffic on the web page and web site associated with the content provider. Interesting content is rewarded by other registered users posting quality approval "QA" tokens on the identified web page.

It is another object of the present invention to share ad referral revenue with the content provider, the system operator and any other person or entity referring the content provider to the system operator and the registered users posting quality approval tokens thereby incentivizing the content providers and the posting registered users.

It is an additional object of the present invention to increase the renumeration to the content provider based upon traffic on the content provider's web page, quality of the content ranked by visitors, and quantity of the content posted on other web pages by the user, wherein the other user supplied content is posted to other web pages supported by the system operator.

It is an additional object of the present invention to increase the renumeration to the content provider based upon content analysis, resulting in relevant ad insertion, and further based upon user-visitor historic analysis (for un-registered user-visitors, based upon referral source, IP address and monitored site history during the present time frame, and for user-visitors that log-in via their user name, based upon user profile) resulting in further insertion of relevant ad materials, thereby increasing the ad revenue for the content provider and the web site operator due to both content and visitor ad relevancy factors.

It is another object of the present invention to incentivize the content provider who supplied content to the published web page by sharing the associated sales referral fees with the content provider based upon a predetermined formula accounting for a frequency of posting other content supplied by the content provider, quality "QA" rankings posted by registered user-visitors, a gross value of the associated sales referral fees set by the corresponding advertiser designated web site, and the number of user-visitors who go to the published web page with the supplied content.

It is a further object of the present invention to incentivize registered user-visitors by providing each registered user-visitor with a predetermined quantity of quality "QA" ranking tokens, by sharing said associated sales referral fees with some or all of registered user-visitors who post quality tokens in conjunction with content on the ad carrying web page based upon a predetermined quality ranking formula accounting for the quantity of posted tokens, the sequential order of posting and the number of user-visitors who go to the published web page with the supplied content, and the shared content provider fee subject to the posted quality tokens.

It is an additional object of the present invention to provide a payment processing system enabling the content provider and the registered user to transfer earnings from the monetized content to his or her credit card, debit card, cell phone or other financial-based account under his or her control.

SUMMARY OF THE INVENTION

The present invention is a computer-based method and system of sharing revenue with a content provider supplying electronic content wherein some electronic content is directly supplied by said content provider and some is preexisting provider controlled content from various third party content web sites. The supplied electronic content is merged or inserted into a web page with advertisements relevant to the content and advertisements relevant to a user-visitor. Each ad has a respective ad display and hyperlink to a corresponding advertiser designated web site. A plurality of registered users and non-registered users view the merged web page. The method and system publishes the web page with the supplied electronic content and one or more ads with respective ad displays and corresponding hyperlinks on the Internet at an assigned Internet address. Associated sales referral fees (click-through revenue) are tracked, via a tracking module, wherein a user-visitor selects an ad display and hyperlink from the published web page and the tracking module monitors such acts. The content provider, who supplied content to the published web page, is incentivized because the system shares the associated sales referral fees with the content provider based upon a predetermined formula accounting for a frequency of posting other content supplied by the content provider, quality QA rankings posted by registered user-visitors, a gross value of the associated sales referral fees set by the corresponding advertiser designated web site, and the number of user-visitors who go to the published web page with the supplied content. The content supplier compensation formula may include other information and user-related factors.

Registered user-visitors are incentivized by providing each registered user-visitor with a predetermined quantity of quality QA ranking tokens and by sharing the associated sales referral fees with some or all of registered user-visitors who post quality tokens in conjunction with content on the published web page based upon a predetermined quality ranking formula accounting for the quantity of posted tokens, the sequential order of posting and the number of user-visitors who go to the published web page with the supplied content, and the shared sales referral fee allocated to the content provider who supplied the content subject to the posted quality tokens.

The shared sales referral fees are transferred, under the control of the incentivized content provider or incentivized registered user-visitor, to a designated payment processor such as a debit card account maintained by a financial institution; a credit card account maintained by a financial institution; a cell phone account maintained by a telecommunications institution; an Internet-based payment processor; a micropayment processor; and a virtual currency processor. Further, the content provider or registered user-visitor, designated as a transferor, may transfer a designated portion of his or her shared sales referral fees to another registered user-visitor or another content provider, or to a designated charity. The transfer to any payment processor or any other registered user or charity is subject to a transaction fee and predetermined monetary thresholds.

BRIEF DESCRIPTION OF THE DRAWINGS

Further objects and advantages of the present invention can be found in the detailed description of the preferred embodiments when taken in conjunction with the accompanying drawings in which:

FIG. 14 shows the Account Maintenance Program.

DETAILED DESCRIPTION OF THE PREFERRED EMBODIMENTS

The present invention relates to a revenue sharing method and system for a user, who supplies electronic content (sometimes called herein a "content provider") and a system operator who operates the system, provides a user friendly platform to commercially exploit user supplied content, and a method and system of sharing revenue with registered users who rank or rate content with QA tokens. These revenue sharing systems incentivize users and drive traffic to the system operator site and the user supplied content thereby driving additional traffic to relational advertisers. Similar numerals designate similar items throughout the drawings.

Figure 1:
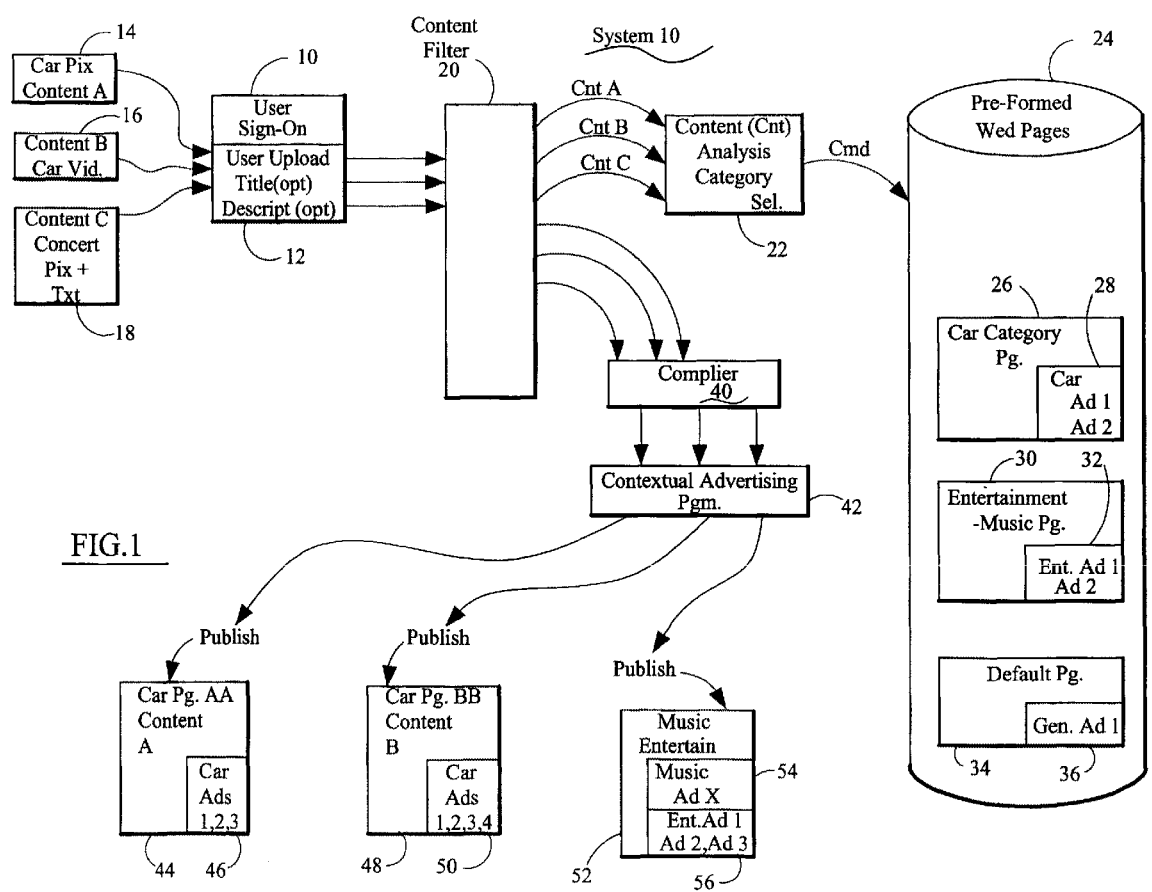
FIG. 1 diagrammatically illustrates both the system and the method for merging user supplied electronic content with preformatted web pages and relational advertisements.

FIG. 1 diagrammatically illustrates the system and the method of merging electronic content, supplied by user, with preformatted web pages having relational advertisements thereon. System 10 is operated by a system operator and generally includes functional components such as content filter 20, content analyzer and category selector 22 (a category comparator), a data collection or database of preformed web pages 24 and relational ads, a compiler integrating the electronic content from the user with the selected preformatted web page and generating a merged web page, a contextual advertising program module 42 and the web site publisher for publishing various merged web pages 44, 48, 52 each having a unique assigned Internet address. The same server address subsumes each respective assigned Internet address for each merged web page, that is, the system operator server address is the same in all the assigned Internet addresses and the merged web pages all have a unique assigned Internet address.

Functional block 10 illustrates that a user must sign on or log into the system. The following User Profile Table shows typical information collected by system 10 when the user initially logs on or signs into the web page publisher system 10. The User Profile—Table A is supplemental as discussed later in connection with FIG. 11.

TABLE A

| User Profile |
| --- |
| Contact data (including zip code) (name, address, etc.) |
| User group(s) |
| Preferences |
| Negative preferences |
| System site history |

TABLE A-continued

User Profile

Total time on system site
Hits on page AA, BB
Time on content page AA
Time on page BB, etc.
User's location data
I.P. address, longitude-latitude geographic tags
Search history
Current search history
Historic search routes
System site visit count Q
Upload content to site count Q-content (content count) (# uploads)
Upload comment count Q-critic (critical comment count) (# comments)
Referred by *Jim Smith*
Referral count Q-refer
For all posted content
   Page rating or QA rank (1 to 5, 5 being best)
   Average rating or ranking, usually an aggregate
Total sales referral fees earned (list fees per content page)
Content provider account balance
Referrer account balance Of course, the User Profile may contain other information that enables the system operator to either generate additional relational advertisements or exclude advertisements (negative preferences) and generate additional traffic to the merged web pages. As noted in functional block 12 of FIG. 1, the user uploads content and optionally (OPT) adds a descriptor title to the uploaded electronic content and/or a description or descriptor of the electronic content. Abbreviations found in the drawings and sometimes used in this specification are identified later in the Abbreviations Table near the end of the specification. The user need not identify a title or descriptor for the uploaded content. All content data, meta tags, descriptors, tags and labels are uploaded by input 12. In the example shown in FIG. 1, the user uploads Content A, which is an electronic image or picture of a car, as functional block 14, uploads Content B, which is a video of a car at functional block 16, and uploads Content C, which is a picture from a concert and text (txt) describing the concert event at functional block 18. The user function 12 uploads each of these contents A, B, C at different times. The content count is then set at 3 uploads. Of course, a plurality or a number of users log into the system and complete their respective user profiles (Table A) and are permitted to then upload a large volumes of content onto web-based system 10 provided by the system operator. Commonly, a user uploads one content into the system 10 at one time. Content A, B, C is shown in order to explain the relational advertisements and the merger with preformed web pages.

In system 10, content filter 20 processes the uploaded Content A, B, C from the user. The content filter 20 sometimes operates on the content itself such as the text in Content C. This semantic analysis of the content enables the system to identify, potentially, the band, the event, or the site (location) of the concert. Therefore, if the uploaded content is text, the relevancy factors of the content are found in the supplied content itself (semantic analysis). Further, the content may have indicators or meta data indicating the time the photograph or video was taken, the camera which captured the picture or video, the date, as well as the author or creator. Hence, these content relevancy factors are located and extracted by content filter 20. The content may also have geographic data either input by the user upload function 12 as a title or description or may have meta data with geographic location, time of creation, author or creator, as well as other indicia of content relevancy. The I.P. upload address may also have relevancy. The outputs from content filter 20 are content relevancy factors A, B, C associated with Content A, Content B and Content C. The content analysis and category selector 22 determines the hierarchical category of the content. Sometimes, the user will select a category such as "automobiles" for car picture as content A. Other times, with respect to content C, the text may indicate the category. For example, the band Black Eyed Peas may be stored in category selector 22 and the system may recognize the band Black Eyed Peas as being associated with musical entertainment. Therefore, a hierarchical analysis of relevancy factors is employed by category selector 22. Alternatively, or in addition thereto, an orthogonal based analysis of relevancy factors is processed. Orthogonal analysis involves a relationship between two categories at the same hierarchical level. Automobiles can be generally orthogonally classified with motorcycles but both automobiles and motorcycles fall into a hierarchical category of vehicles. Further, semantically based analysis to obtain one or more relevancy factors can be employed by category selector 22.

In any event, a command (cmd) is presented to the database or data collection 24 of preformed web pages. Data collection 24 includes various preformed web pages wherein each preformed web page is associated in some manner with one or more advertisements. The association may be an electronic link, meta data, an index link or may be embedded in the ad image. The ads are also stored in data collection 24. In any event, preformed web page 26 relates to a "car" category page having ad space 28 with car advertisements 1, 2. Either the preformed web page includes the ads 1, 2 or these ads are merged into the page by a compiler. Entertainment preformed web page 30 has a sub category entertainment-music page. Ad block 32 includes a link or an electronic association with entertainment ad 1 and entertainment ad 2. If there is no relationship or match between the content relevancy factors (which would include an analysis of the title and descriptor supplied by the user), then the system activates default page 34 with general ads 1 in ad space 36. The match may employ a comparator using these semantic and classification theories. The command cmd from category selector 22 causes the output of a preformatted web page from collection 24 and an input of the same into compiler 40. Compiler 40 merges the appropriate user supplied content with the related preformed web page which then includes the relational ads. The output of the compiler 40 is an interim web page which is then processed by contextual advertising program 42. The relational data may be embedded in the page as meta data. Otherwise, data collection 24 has an index system for pages, ads and content. The contextual advertising program is known by persons of ordinary skill in the art. One example of a contextual advertising program is the Google Ad Sense program, which adds additional ads or inserts additional related advertisements into a web page. In any event, the merged web page is published at a certain assigned Internet address. Therefore, car page AA is published as web page 44 having content A and car advertisements 1, 2, 3 at ad space 46. Car page BB has a different assigned Internet address (although the same "root" server system address) and includes content B car and ads 1, 2, 3, 4 as generally shown as published or merged web page 48. Web page 52 is music entertainment page having music ad X which as been added by contextual advertising program 42 as well as entertainment ad 1, ad 2, ad 3 in advertising space 56. Note that the preformed web page 30 includes an entertainment ad 1, and ad 2 but the published merged web page includes an additional music ad X. Music ad X is added by the contextual advertising program 42.

Examples of categories which may be employed by category selector 22 is found below in Table B.

TABLE B

| Categories |
| --- |
| All |
| Animals |
| Arts and entertainment |
| Business |
| Causes and activism |
| Comedy |
| Education |
| Food |
| Games |
| How to |
| Lifestyle |
| Movies and television |
| Music |
| Nature |
| News and politics |
| Science and technology |
| Sports |
| Travel |

Other categories may be added by the system operator.

The design and format of the merged web page may change from category to category or the preformatted web pages may be static. For static pages, one content or category page looks fairly similar to another category page except for the different advertisements. It should be noted that the format of the merged web page is completely within the control of the system operator. The user supplies the content on a web page and the content area is predetermined on the web page by the system operator for system 10.

Regarding the input of the content, the following Table C provides an example of one type of input page.

TABLE C

| Example of Operative Input Page |
| --- |
| Select tabs (functional buttons) - horizontal top bar |
|     all content |
|     blogs |
|     photos |
|     videos |
|     documents |
|     links |
|     search |
|     upload |
| Select upload type - vertical left side bar |
|     blog |
|     photo |
|     video |
|     document |
|     link |
| View space uploaded item |
|     content info (see Table D) |
|     money earned |
| Select further uploads (functional buttons) - horizontal bottom bar |
|     rate (pull down list; selected by viewer-user) (1 to 5, 5 is best) |
|     favorite (permits user-viewer to link to his or her web page) |
|     flag (indicates special significance) |
|     tag |
|     related content (shows thumbnails of related content with creator, tags or description, view count, money earned, rating-favorite) |
| Advertisements (includes ad display and hyperlinks) |
|     right side bar, bottom bar, top horizontal bar |

Other types of input pages may be utilized.

The following Table D lists the types of electronic content which may be uploaded into system 10.

TABLE D

| Upload Content Type |
| --- |
| Blog (text) |
| Photo |
| Video |
| Document (text, embedded image, links) |
| Link |

Also with respect to the input, the user may be requested to input a reasonable amount of descriptive information regarding the uploaded electronic content. The following Table E shows typical information requested by the system either prior to uploading the content or shortly after uploading the content.

TABLE E

| Content Information |
| --- |
| Creator (Author) |
| Upload time (or time since upload event) |
| Times rated by viewer-user |
| Times designated as favorite by viewer-user |
| Times commented (text) |
| Description (by uploading user) |
| Meta tags |

Figure 2:
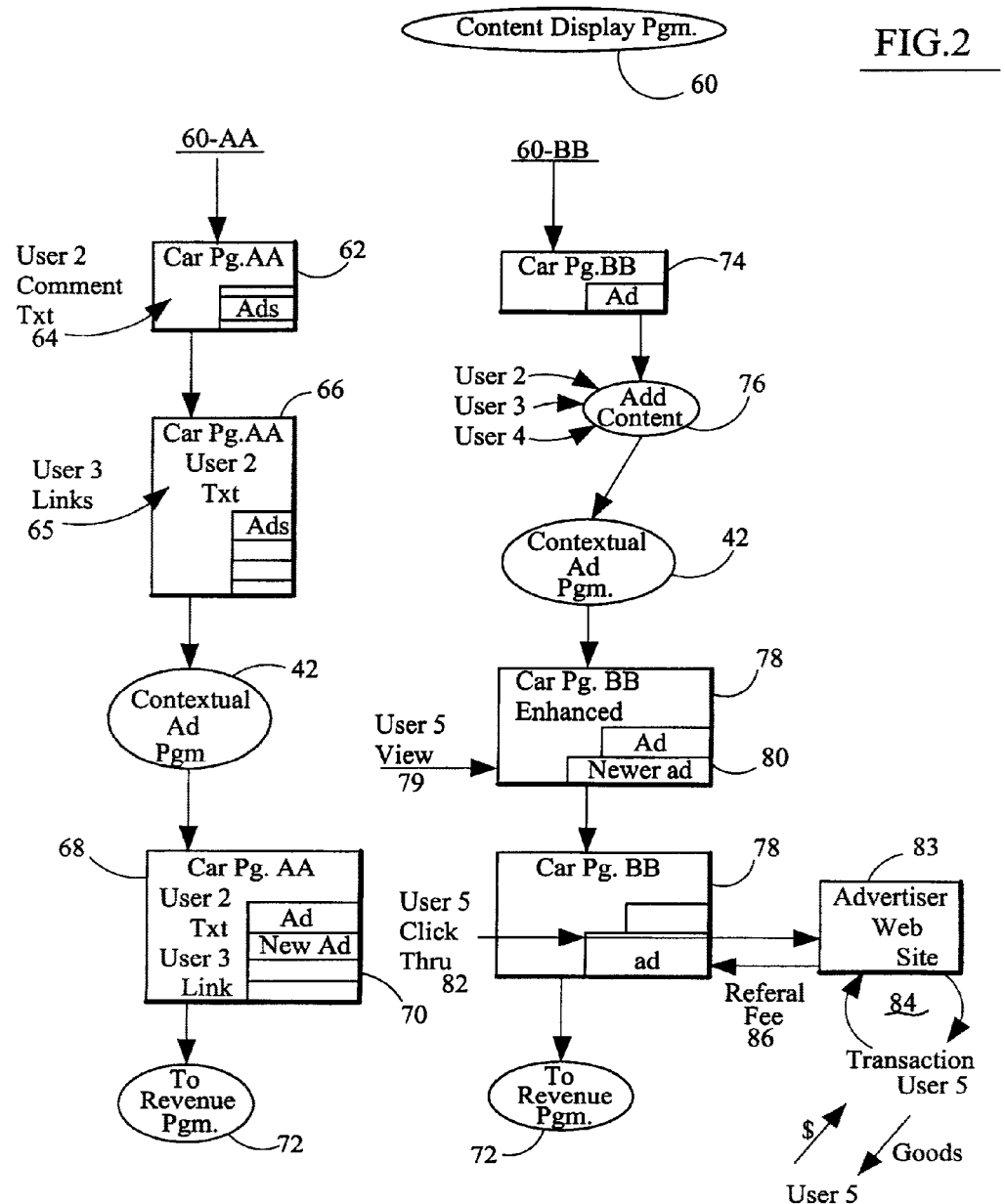
FIG. 2 diagrammatically illustrates supplementing the merged web pages and also generation of the associated sales referral fees when a visitor clicks through a relational ad to a third party advertiser designated web site.

FIG. 2 diagrammatically illustrates the content display program 60 and, more specifically, shows two processes: content display routine 60-AA referring to car page AA, at one unique, assigned Internet address; and routine process 60-BB for car page BB at a different assigned Internet address. Both addresses have the same server root address. With respect to routine 60-AA, user 2 added comment text 64 to car page AA 62. In other words, the content A, which is a picture of a car (see functional block 14, FIG. 1), is subject to a second user 2 inserting comments as a text at function 64. The comments may be formatted as a blog entry. This increments comment counts in both user profiles (content provider and comment provider). The resulting enhanced car web page AA is shown as web page 66 wherein user 2 text is embedded or inserted or merged into the car web page AA. A third user 3 adds links or hyperlinks 65 to car page AA 66. In functional block 42, the system executes the contextual ad program discussed earlier in conjunction with FIG. 1. Car page AA 68 then includes new ad 70 inserted by contextual ad program 42. Car page AA 68 also includes user 2 text and user 3 link. The system then goes to the revenue sharing program 72 discussed later.

Routine 60-BB begins with car page BB 64. The add content functional module 76 notes that user 2, user 3 and user 4 have added content to car page BB. Functional block 42 indicates that enhanced car page BB has undergone a contextual ad program routine. New ad 80 has been added by contextual ad program 42. User 5 is viewing car page BB 48 as shown at function block 79. In the following block, car page BB 78 has user 5 clicking through a displayed relational advertisement at function 82. This click through activates a hyperlink in the newer ad 80 such that user 5 is transferred to a third party web site or an advertiser designated web site. The advertiser designated web site 83 permits user 5 to engage in a goods or services transaction 84 which, in the example shown in FIG. 2, includes goods being transported to user 5 and user 5 paying money or other compensation to the advertiser designated web site 83. This results in an associated sales referral fee 86 being generated by third party site server and ultimately this sales referral fee is transferred from advertiser designated web site 83 to the system operator supporting car page BB. The associated sales referral fees paid by advertisers or manufacturers supplying the goods or services via advertiser web site 83 are well known as "click through fees" by persons of ordinary skill in the art. Sometimes, third party site 83 pays a fee just for the click through without the need for a sale. These fees are classified herein as sales referral fees. The referral fee 86 is tracked by the system operator operating system 10 as explained later. The tracker is a simple accounting program accepting periodic electronic reports from web site 83 to the system operator at system 10. The reports note referral site 78, the click through, and sales 84. Effectively, the referral fee 86 is logged into and associated with the content user profile as part of the total sales referral fees and unique fees associated with content B on merged car web page BB 78.

Referring to the User Profile, Table A, and to content display program 60, the system accounts for each utilization of each web site established by each content provider-user. Therefore, the system site collects information as to visitor time on content page AA and visitor time on content page BB and also the total visitor time for all the content provided by the user content provider. The total time on the system site is stored as well as the sequence of views. The user profile also provides information regarding the user's initial log in site such as the source Internet protocol or IP address. The system translates that IP address into geographic longitude and latitude data. This enables geographic relevancy data to be part of the selection process for the preformed web pages 24 (FIG. 1) or the contextual advertising program 42. The system counts total site hits or visits in the user profile, Table A, as the total number of viewers that strike or land on car page AA, as compared with car page BB, or as compared with content page C. The user profile also accumulates data noting how often the user uploads content to any other web pages (newly created web pages) maintained by the system. Commentary textual input (cmt) on other web pages by the user is counted. Therefore, the user 2 may add comments (cmt) on car page AA 62 and this increments the user 2 profile and content provider AA. In a similar manner, if the comments supplied by user 2 are critical of the site, the user 2 comment quantity is incremented for user 2 but decremented on the content provider. Alternately, critical comments may not trigger a reduction. User 1 who posted the content A may have the critical count incremented. This indicates that other users have a negative impression of content A. The "referred by" field in the User Profile indicates which person or entity referred the content provider user to the system operator. The referral count, Q-referred, indicates how many additional users the profiled user has added to the system operator site (the profiled user refers others to the site). The referral data may be hidden from the user and only available to the system operator. "Referred by" data and "Acts as a Referrer for User AK" data is also collected in the User Profile. The User may see the "Acts as a Referrer to" data. The user profile also includes fields for page QA rating or ranking by other users and a total aggregate rating. Therefore, rather than inputting textual comments by user 2 and links by user 3, user 2 and user 3 may increment or decrement a quality approval or QA ranking for the quality of the content A on car web page AA. The QA may be a single token or may be multi-level QA ratings like A, B, C and D. As discussed later in FIG. 13, each registered user has N tokens (e.g., 5 QA tokens). If graduated, the User may assign 5 "A" tokens or 5 "D" tokens. The overall ranking for content on a single published page is the aggregate of all individual QA rankings and the number of users commenting or rating the content is also calculated as a quantitative number. Sometimes, the ranking is stored as an index with the web page. In other words, if 100 users write a particular comment-like content on the web page, this number "100" indicates a high ranking for the posted content. If the aggregate QA ranking (1-5) (5 being the best or high quality), shows a qualitative ranking of 4, the system operator knows that the content is a high quality. As noted later, these metrics are used to alter the sharing of referral fee revenues.

Figure 3:
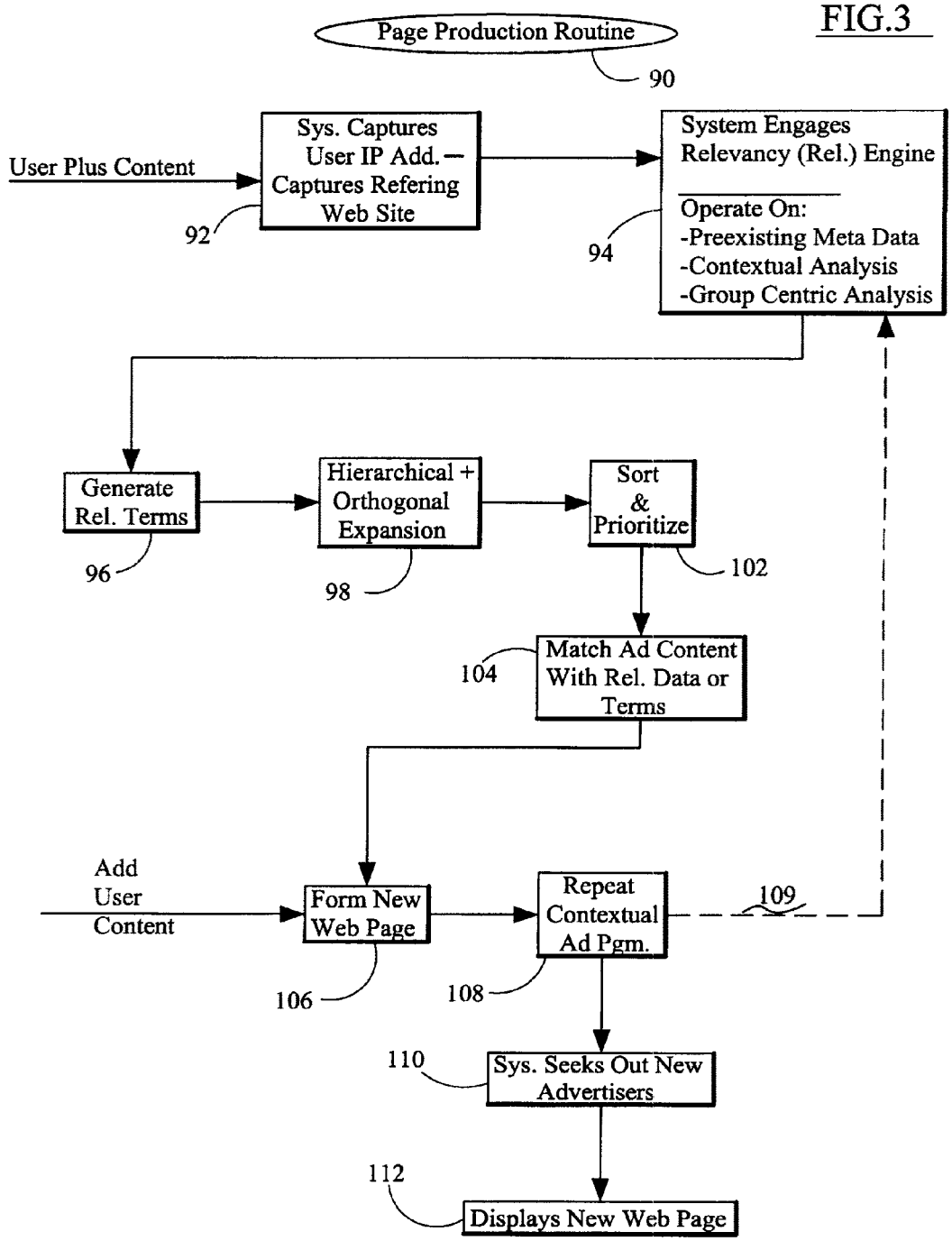
FIG. 3 diagrammatically illustrates the process or page production routine.

FIG. 3 diagrammatically illustrates a page production routine 90. Functional block 92 indicates that the system captures the user's internet protocol or IP address (the source of the upload) and also captures the referring web site, if the user has transferred to the system web site from another website. This user logs in (assuming the user is pre-registered) and submits content to the system as an input. Functional block 94 indicates that the system engages the relevancy engine. The relevancy engine operates on the preexisting meta data in the content uploaded by the user, conducts a contextual analysis of the content of any title or descriptor added by the user during the upload process, and also engages the user's profile to conduct a user centric analysis as well as a user-group centric analysis. An example of a user-group centric analysis is all students that attend University ABC in Any Town, State. A user centric analysis involves, as an example, that the user is a male who lives in Kansas and has interest in vintage automobiles. In contrast, a "student" user having a user address or zip code in New York City is more interested in entertainment, such as Broadway shows, as compared to vintage automobiles. Therefore, the relevancy engine for the user in Kansas provides more automobile related ads such as automobile accessories and automobile entertainment such as NASCAR events. In contrast, the New York City user is provided with more information regarding Broadway shows, concerts in Madison Square Garden, and entertainment events in Atlantic City, N.J.

Functional block 96 notes that the system generates one or more relevancy factors related to either the supplied content, user data from the user profile, predetermined user-group profile and any referral source data noted by the user. The referral source may be the web site from which the user is referred to the system website or a person or company who referred the user. See functional block 92. Functional block 98 indicates that the relevancy factors for the electronic content supplied by the user are further processed based on higher hierarchical categories (see Category Table B or orthogonal expansion from one hierarchical class to another). Functional block 102 sorts and prioritizes these relevancy factors. The sorting-prioritizing function 102 may be based upon prior search history of the user (collected in the User Profile, Table A), the current search history, the purchasing patterns of the user, the purchasing patters of one or more groups associated with the user or other user centric, group centric or historic patterns. Function block 104, a comparator, matches the ad content or, more precisely the add relational data, with the relevancy factors for the user supplied content. The ad relational data is associated with each advertisement and each advertisement has some association with the preformatted web page. For example, in one embodiment, each advertisement may include meta data associated with the advertisement and incorporated in the electronic version of the advertisement and the ad relational meta data can be matched semantically or hierarchically or orthogonally with the content relevancy factors, the user profile, and the user title and descriptor, or other information supplied by the user when the user uploads the electronic content to the system.

Step 106 forms the new web page. This step includes the insertion or merger with user content the preformed web page and the relational ads. Function 108 repeats the contextual advertising program (program 42 in FIG. 1). This may include a repeat, as noted by branch 109, to the relevancy engine 94. In step 110, the system seeks out additional advertisers. This may involve preliminarily posting the merged web page on the Internet with a publishing engine and operating the contextual advertising program 42 on the published web page. Step 112 displays a new web page.

Figure 4:
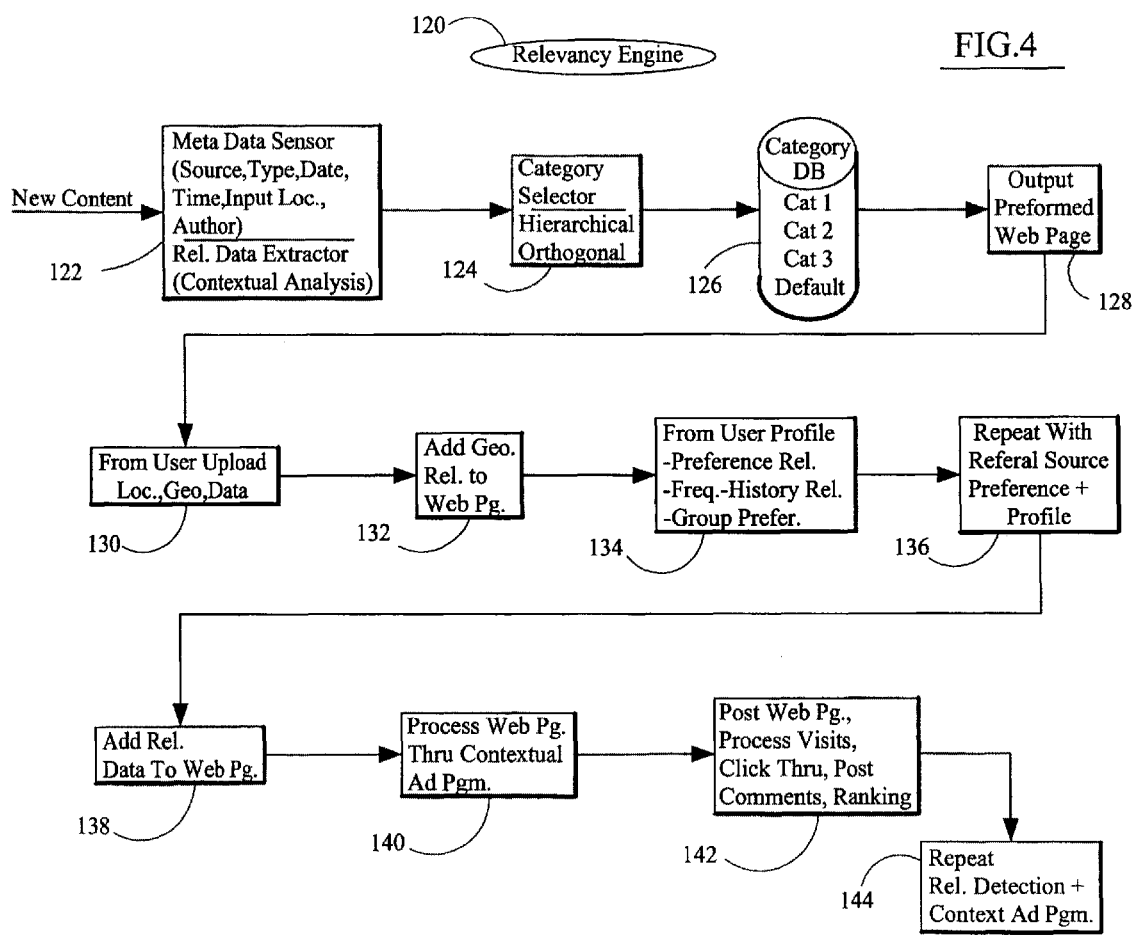
FIG. 4 diagrammatically illustrates the functional modules and the processes for the relevancy engine for the user supplied content.

FIG. 4 diagrammatically illustrates the relevancy engine 120. In functional block 122, new content is added or inputted into the system. Functional block 122 is a meta data sensor which identifies the source of the content, classifies the content by type such as a picture, video, text, blog, etc., identifies the date in the meta data with the content, if available, the time, the location or the IP address from which the content is uploaded, and the author or creator. Further, functional block 122 has a relevancy data extractor which may include a contextual analysis of the meta data. Functional block 124 is the category selector which may employ a hierarchical or an orthogonal expansion routine. The category selector 124 operates on a category database which is electronically linked or indexed to preformatted web pages in categories 1, 2, 3, ads and a default preformatted web page. Output 128 is the preformed web page. Function block 130 obtains the user supplied content and notes the location of the source of the content and the geographic data associated either with the source (IP data from upload source) or the user. Functional block 132 adds geographic relevancy to the web page being formatted. Function block 134 obtains information from the user profile including preferences input by the user during the initial log on (or revision of the user profile), as well as the frequency and history relevancy data from the user profile and the group preferences. In other words, all students from a particular university may be grouped automatically into a group and the preferences of the overall group may be utilized to better obtain relevancy factors for the particular uploaded content. Function block 136 repeats the system with the referral source for the user and the referrer preferences and the referrer profile. In other words, in addition to sharing the advertising revenue with the content provider, the system further shares advertising revenue with the person or entity who referred that content provider. Therefore, the referral source data and preference in the user profile is an additional indicator of relevancy. Function block 138 adds the relevancy factor data to the web page. Function block 140 processes the web page through the contextual ad program. See contextual advertising program 42 in FIG. 1. Functional block 142 posts the web page on the system server, processes visits through the web page, processes click through data to advertisers and advertising sites from that distinct web page, posts comments from other users, and posts rankings of the content on the web page. The relevancy factors compiled for a particular web page may be including as meta data in the page or may be stored in the system database or index associated with the content. These relevancy factors can be utilized to better enhance the relevant advertisement for that content web page. Function block 144 repeats the relevancy detection and repeats the contextual advertising program campaign.

Figure 5:
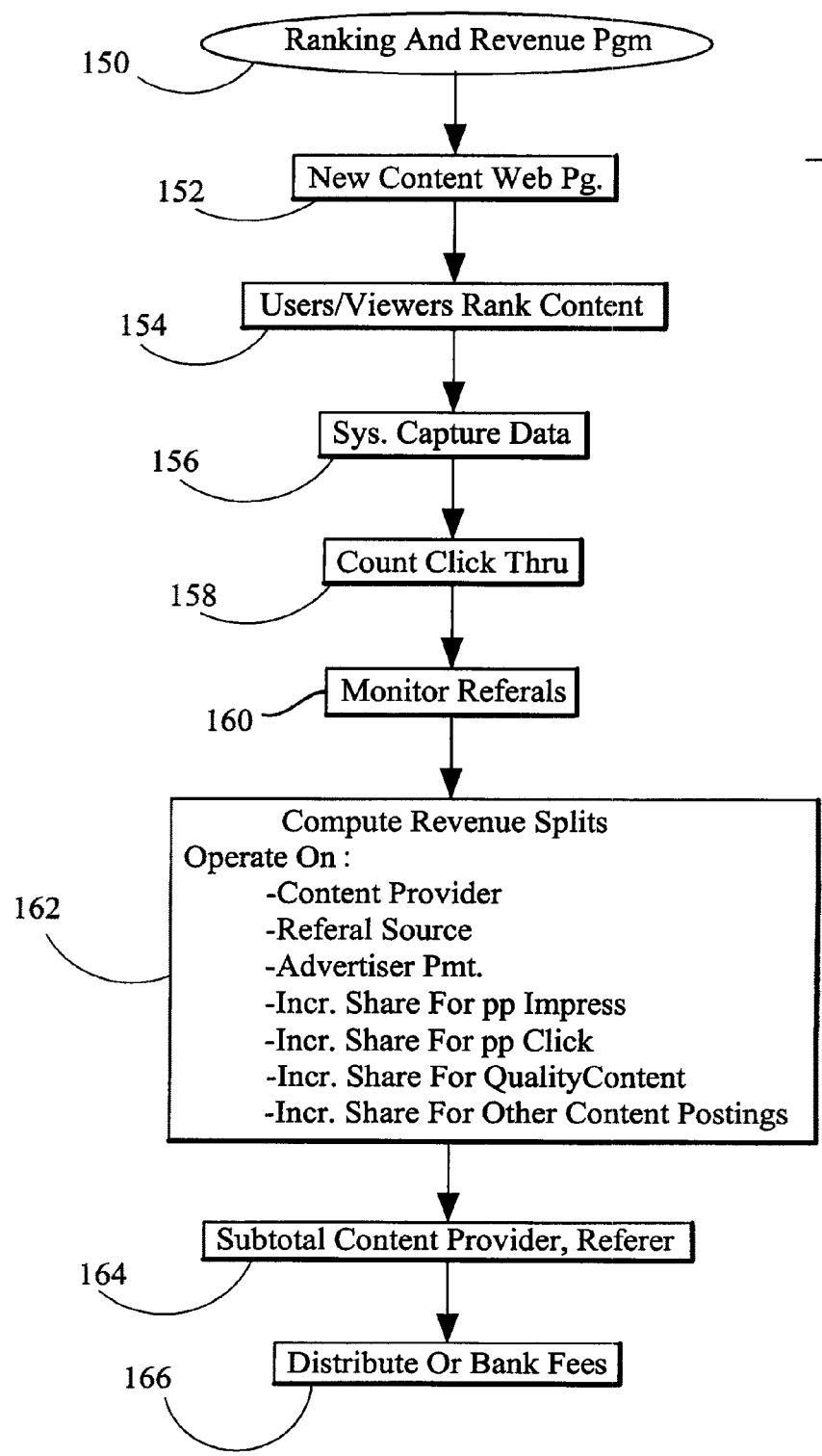
FIG. 5 diagrammatically illustrates the ranking and revenue program and tracking modules.

FIG. 5 diagrammatically illustrates the ranking and revenue program. Functional block 152 notes that a new web page with new content has been published by the system server. A user and viewers to that web page, rank the content on the web page at block 154. In 156, the system captures the data as a qualitative ranking data or a commentary to the content, or a negative comment to the content. Function block 158 counts the number of users or visitors to that new web page. This is illustrated in routine 60-BB in FIG. 2. Function 160 monitors referrals to that web page from other web sites. Function 162 computes the revenue split from referral fee 86 (FIG. 2) for that user supplied content. The revenue split is computed based upon a predetermined formula (which may be changed by the system operator in its discretion). The factors which may be accounted for in the formula include the quality and quantity of content provided by that particular user, the referral source for the content and for the user, total advertisement payments or click through payments from that content and web page. The revenue split to the content provider preferably will be increased based upon the per page impression or views (pp impress). Further, the fee paid to the content provider may be increased based upon the per page click through count, may be increased based upon the quality of the content and may increased based upon other content posting by the user. Negative comments and rankings may decrement the revenue share. In other words, if a user posts 100 instances of new content on 100 web pages, that user's revenue share is increased compared to a user that only posts new content on 5 new web pages. Function block 164 sub totals the information for the content provider and subtotals data for the person or company who referred the content provider. The revenue split by the system operator accounts for the content provider but also the person or company who referred the content provider to the system operator. Function block 166 distributes the revenues or banks the revenues fees for later distribution in accordance with contractual terms with the system operator. Although the revenue share formula is predetermined or pre-set by the system operator, the operator may change the revenue formula to meet economic conditions.

Figure 6:
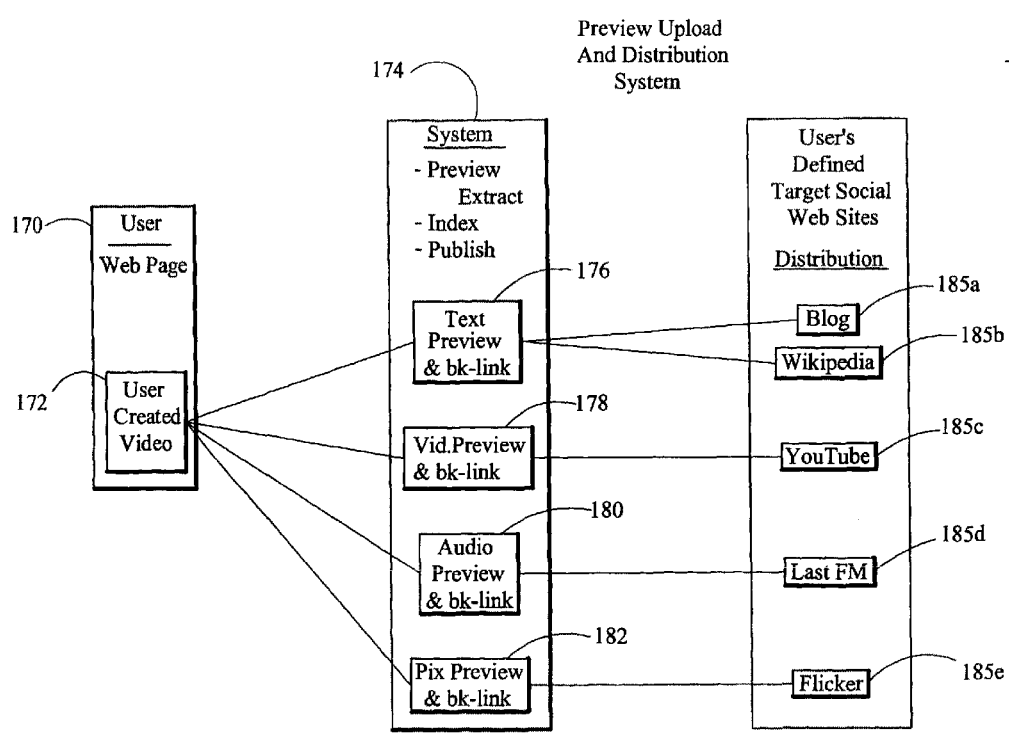
FIG. 6 diagrammatically illustrates the preview upload and distribution system.

FIG. 6 diagrammatically illustrates the preview upload and distribution system. In functional block 170, the user has input an approved web page which has been published by the system operator on the system server. The content on user web page 170 is a user created video 172. The system, in functional block 174, uses a preview extractor for the video as well as an indexing system and a publisher. The preview extractor extracts a preview of the text or script (a short quote) from the user created video as noted in function block 176. Alternatively, the descriptor supplied by the content provider may be used. A snippit of the scrip or text for the user created video 172 includes a portion of the text as well as a hyperlink or bk-link enabling any third party, if they are interested, to click on to the bk-link-hyperlink which would then transfer that viewer from the preview to the user created video 172, on the system server (see pages 44, 48, 52 in FIG. 1). A snippit of the user created video 172 is extracted in the previewer as video preview 178. The publisher in functional block 174 adds a hyperlink to the snippit of the video as a preview. The audio from the user created video 172 is segmented and a preview of the audio track is extracted as audio preview 170. The audio also has a display icon linked thereto with a hyperlink as a bk-link to user created video 172. A single frame picture or image from the user created video is created in function block 182. A thumbnail may be created and distributed. The meta data associated with the user created field may be utilized as the index in module 174. In distributor module 184, the previews are published by the system from function block 174. The user may define targeted social web sites as distribution sites. Therefore, the text preview is posted on blog 185a and the text preview is also posted on Wikipedia 185b. Of course, any site accepting content or any "Wiki" site may be utilized. The video preview is posted on YouTube 185c. The audio preview is posted on Last FM 185d. The picture preview 182 is posted on Flickr 185e. Therefore, any person interested in the user created content and user created web site from blog 185a, Wikipedia 185b, YouTube 185c, last FM 185d or Flickr 185e can click on the hyperlink from the thumbnail preview and be transferred to the user's web page with the user created video 172 thereon. Of course as explained earlier, the user web page has ad content relevant of the user as well as the group and other content-based items which, hopefully, the visitor will click on the ads, go to the advertiser's designated site, purchase goods resulting in the payment of associated sales referral fees which are ultimately split between the user supplying the content and the system operator and any referral source.

Figure 7:
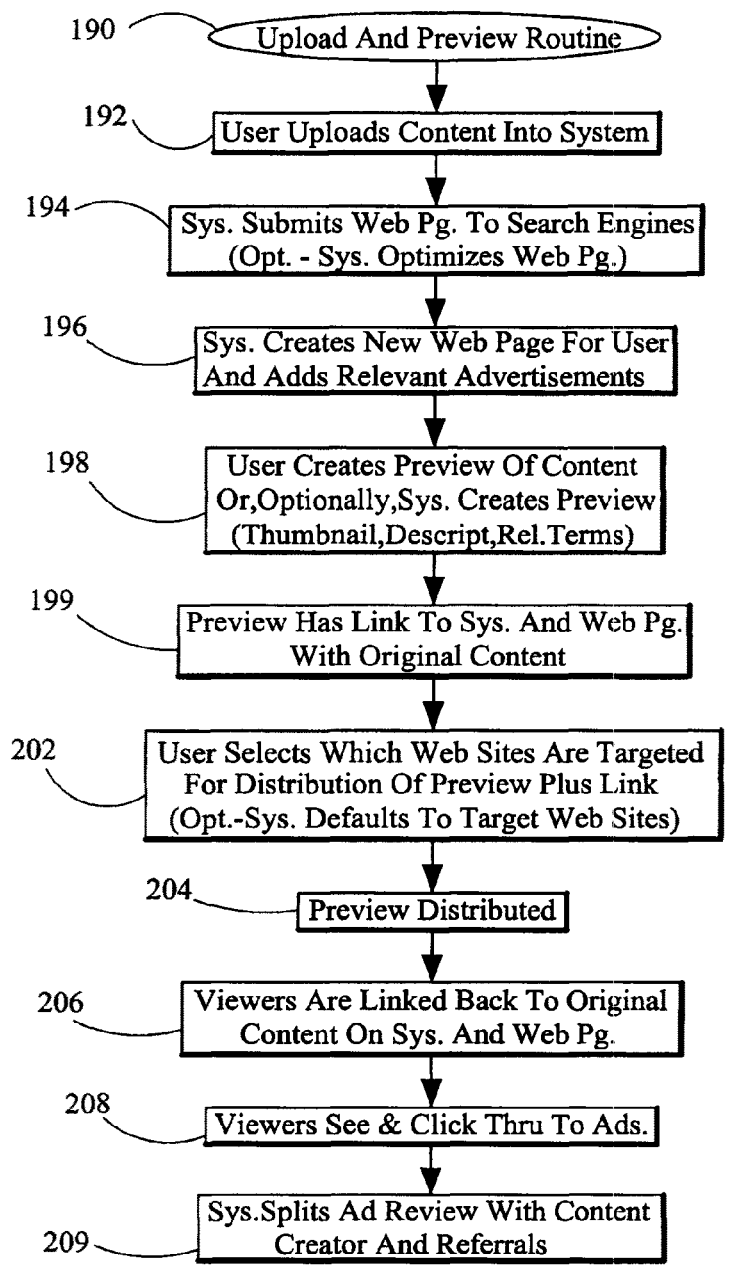
FIG. 7 diagrammatically illustrates the upload and preview routine.

FIG. 7 discloses a functional routine for the upload and preview routine 190. In function block 192, the user uploads content into the system. In function 194, the system creates a new web page for the user and adds relevant advertisement to that new web page. In function 196, the system submits the newly created web page to search engines. Optionally, the system optimizes the web page for better search engine placement. In step 198, the user creates a preview of the content or, optionally, the system creates a preview. The preview could be an thumbnail, a description, a snipppit, a quote from the electronic, content, or a descriptor supplied by the user who, in turn, as supplied the electronic content. Further, commentary by third party users may be added to the preview to enhance consumer interest. In step 199, the preview is modified to include a hyperlink back to the system and to the particular user web page with the original content. In 202, the user selects which web sites are targeted for distribution of the preview plus the embedded hyperlink. Optionally, the system may default to target web sites listed by the user when he or she initially logged in to the system and registered with the system. In step 204, that preview is distributed to other third party publishing web sites. In step 206, viewers are linked from the preview back to the original content on the system server and the original user's web page (see page 52, FIG. 1). In step 208, the viewer sees the web page with the original content and clicks through to advertisements from the web page to advertiser designated web pages. In step 209, the system uses a data tracker to account for sales referral fees and splits ad revenue with the content creator and any referral source of the content creator.

Figure 8:
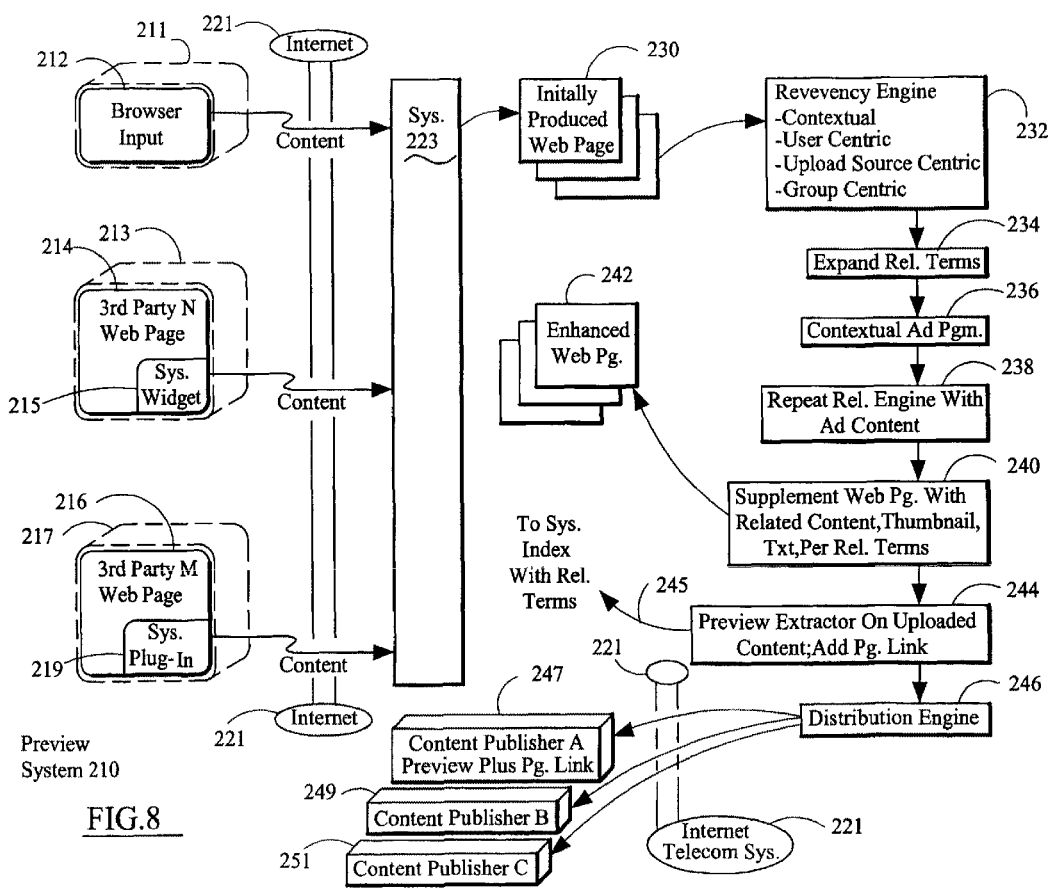
FIG. 8 diagrammatically illustrates the preview system and distribution method and system.

FIG. 8 diagrammatically illustrates the preview system 210. As noted by persons with ordinary skill in the art, the user inputs or uploads content into system 223 via various telecommunications networks commonly called Internet 221. The system operator controls system 223. The user may have a browser input 212 operating on his or her computing device 211, normally designated as a client computer. The client computer 211 may be any computer based device such as a laptop, PC, personal data assistant or an Internet enabled cell phone. Further, as described later herein, the user may activate and download preexisting user controlled content on various third party web sites. For example, third party N may have a web page 214 on third party server 213. The user may upload content from third party server 217 with upload programs from server system 223 and with the permission of third party M. The system, activated either by the user or by the system 223, may extract user content from third party server systems 213, 217 and process that user content as discussed earlier. A widget 215 may be activated on system 213. Another third party web site M 216 has different content on another server system 217. In this instance, the system may have a plug in 219 and third party M web site has granted permission as requested by the user to obtain content from third party M web site owner. In any event, typically, the Internet 221 connection bridges the input system devices 211, 213, 217 with the system 223. The system 223 then initially processes or produces a unique web page 230 which ultimately is assigned a certain unique Internet address. Therefore, for the three web pages initially produced at 230, there will be three assigned Internet addresses.

The relevancy engine 232 operates contextually on the content as well as in a user centric manner and an upload sources centric manner and a group centric manner. The expansion module 234 expands the relevancy factors for the uploaded content. The contextual advertising program 236 adds contextually relevant ads to the web page being produced by the system. Function 238 is a module which repeats the relevancy engine 232 and the contextual ad program 236. The web page is supplemented at supplemental module 240 with related content, thumbnail previews, text and appropriate relevancy terms. The enhanced web pages 242 are then produced and posted on the system operator's web site. As stated earlier, the web page addresses all include a singular server address such that all the web pages have a root server address which enhances the search engine placement of each page on the system server 223.

The preview extractor 244 operates on the enhanced web pages and extracts previews as discussed earlier in conjunction with FIG. 6. The previewer also adds a page link to the enhanced web page 142. Branch 245 sends index terms and relevancy terms to the system 232. This enables anyone who is on the system server to search all the web pages on the server and view other relevant web pages. A distribution engine 246 further pushes the previews to various other publishers or web sites 247, 249 and 251. Content publisher A posts the preview plus the page link to enhanced web page 242. Content publisher B on web site 249 may publish the same preview or a related preview. Content publisher C operates on a third web site 251. These websites at publishers A, B, C are available through Internet or telecommunications system 221 to the distribution engine 246 of the system 223.

Figure 9:
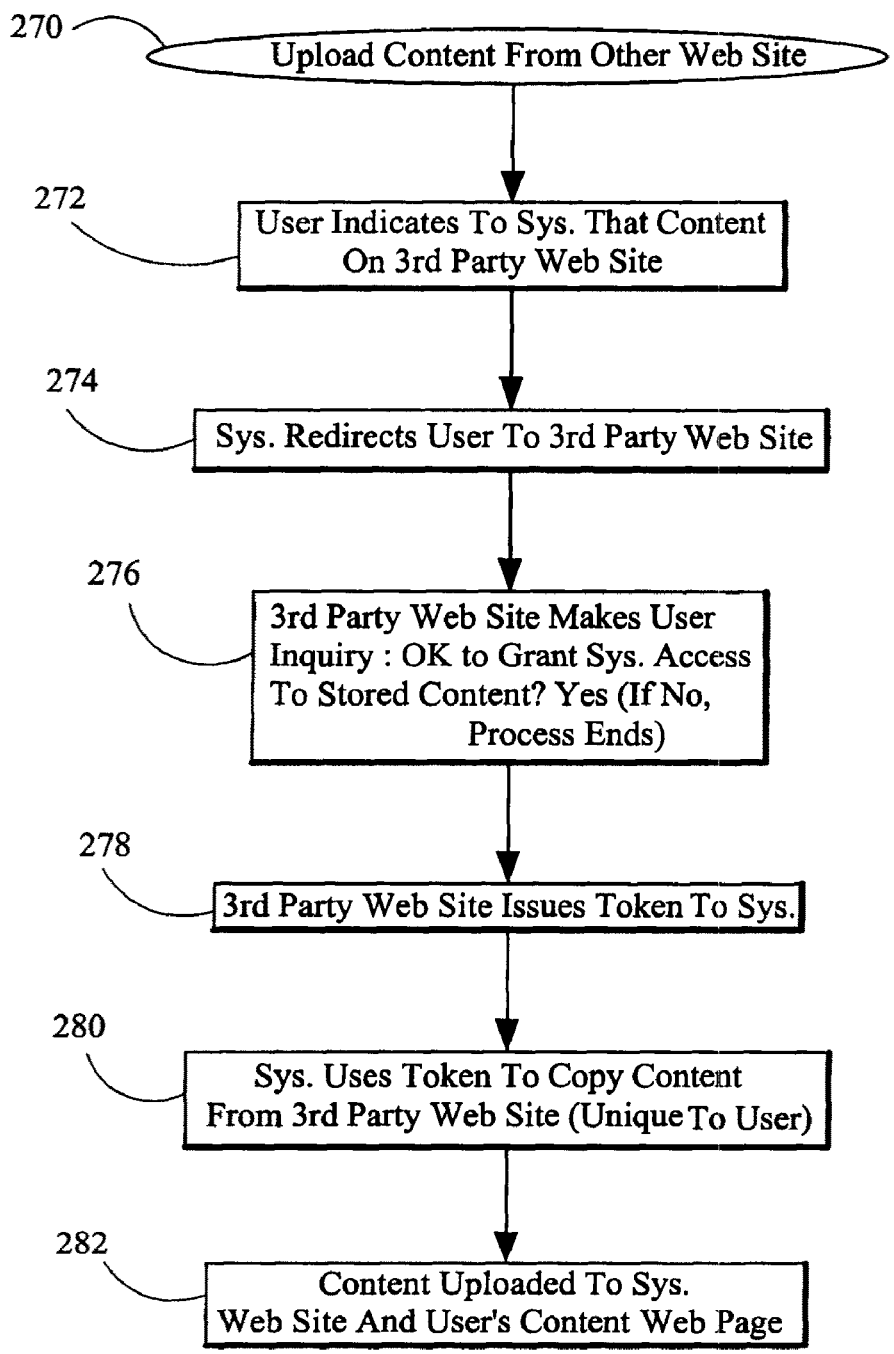
FIG. 9 diagrammatically illustrates a system and block processes (which may be hardware implemented modules) for uploading content from third party web sites, extracting previews and distributing previews to third party sites to drive traffic back to the system operator's site.

FIG. 9 diagrammatically illustrates a process flow 270 for uploading content from another web site. In step 272, the user indicates to the system operator (system 223, FIG. 8), that content is available on a third party web site. The content being "available" on the third party web site must be authorized or approved or created by the user. In step 271, the system operator redirects the user to the third party web site. In step 276, the third party web site makes an inquiry to the user: is it acceptable to grant the system server 223 access to the stored content on the third party's website. If YES, then the process continues. If NO, the process ends. In function 278, the third party website issues a token to the system server for that particular content. In step 280, the system 223 uses the token to copy content from the third party web site, that content being unique to the user, to the system server web site. This is user supplied content. In step 282, the content is uploaded to the system operator's website as user provided content. The following Table lists the type of user supplied content as well as third party web sites where that content may be obtained and identifies the sub-routines permitting the content to be transferred from the third party web site to the system server website. For example, video may be obtained on YouTube by the user activating a Revver API on the YouTube website. The same is true regarding bookmarks and links and comments and photos. For photos, that photo may be located on the Flickr web site and the system web site at Flickr may provide a widget or other routine functionally permitting the authorized user to copy the user supply content from Flickr to the web site operated by the system operator.

| Upload Process: Available Sites and Operation Table | |
| --- | --- |
| Video | YouTube, Facebook, MySpace, Google Videos, Yahoo Videos, Dailymotion, Blip.tv, Photobucket, Metacafe Revver, Veoh, Vsocial, Vimeo Upload Operation: Revver API on system site |
| Blogs | Wordpress, Blogger, Typepad, LiveJournal, facebook, technorati Upload Operation: Blog plug-ins or system site |
| Wiki's | Wikia, Wetpaint, Wikispaces, pbwiki, ziwiki Upload Operation: Wiki plugin or system site |
| Bookmarks/Links | Delicious, Facebook, StumbleUpon, Newsvine, technorati, slashdot, tailrank, Digg, Furl, Reddit, Fark, Propeller, Magnolia, bluedot Operation: Toolbar button; sys. Site |
| Comments | Various websites Operation: Toolbar co-comment |
| Photos | Flickr, Photobucket, Facebook, zooomr, scrapblog, smugmug, slide Operation: Sys. website |
| Reviews/Ratings | Amazon, eBay, epinions, CNET Operation: Toolbar |
| Forums | PhpBB, other forum sties Operation: Toolbar |
| Messages | Twither, Facebook, Jaiku, Pownce Operation: Toolbar or sys. site |
| General Social Network | Facebook, MySpace, Linkedin, bebo Operation: Widget, applications |
| Indexed Website | Google, Yahoo, MSN, ASK Operation: Sys. site |

Figure 10:
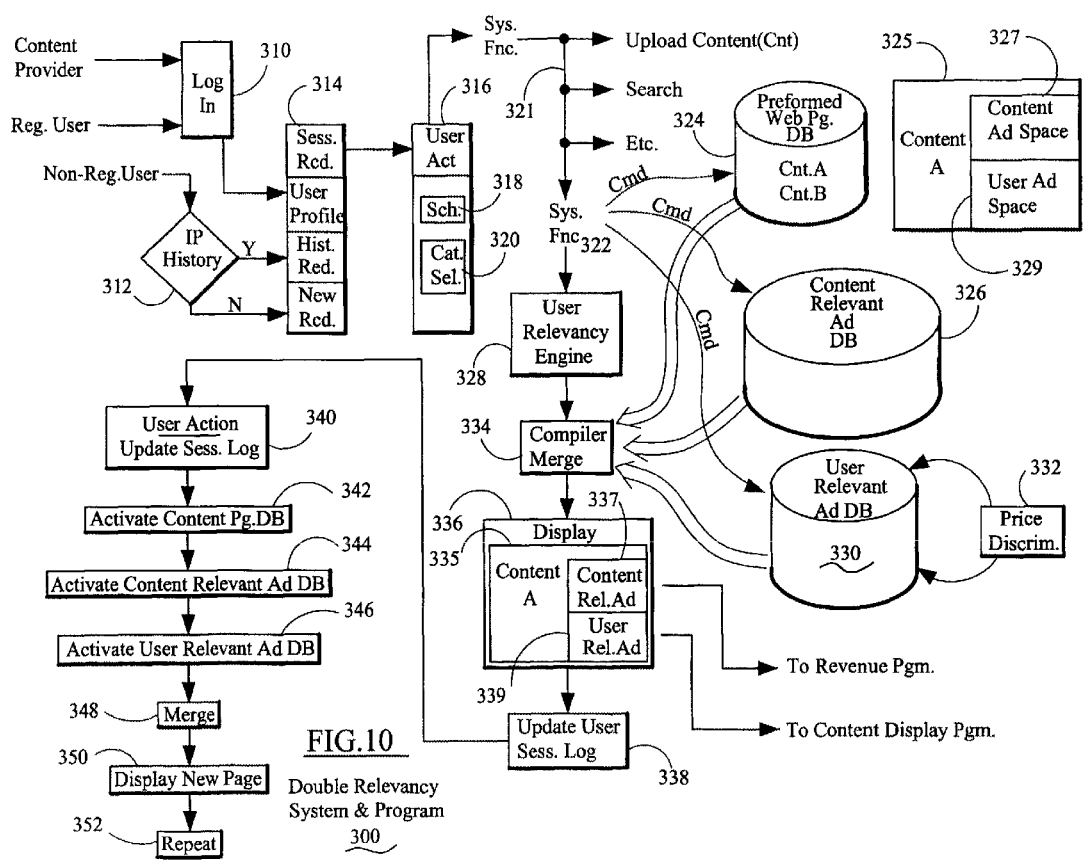
FIG. 10 is a double ad-user relevancy program and a user-visitor tracking system monitoring user relevancy ads on the processed web page.

FIG. 10 diagrammatically illustrates a double relevancy method, system and program. It should be noted that although databases 324, 326, 330 are shown and discussed in connection with FIG. 10, the system may access data collections beyond the confines of the local area network on which the system server normally operates. In other words, some of the advertisement databases may be located on other server networks (such as ad networks) and, in order to obtain the relevant ads (keyed to the ad relevancy terms or factors), the system 10 (FIG. 1) accesses those third party databases or data collections via telecommunication channels (such as the Internet) and downloads the relevant ads for later insertion into the preformed web pages as discussed herein. For faster re-loading after initial download from the third party server system or network, the accessed ads may be stored in the ad databases 324, 326, 330.

In general, the double relevancy ad program (a) determines the relevancy between the content provided by a user-content provider; (v) inserts a relevant ad into a defined space in the preformatted web page; (c) the system watches and monitors user-visitors who traverse and travel over the system operator's web site, thereby collecting current session history information about the user-visitor (in the event that the user-visitor is a registered user, then the user profile is further used for ad monitoring purposes, if the user-visitor has earlier visited the system web site, the stored IP address session history is used); (d) the system and program then identifies relevancy terms unique to the user-visitor; and (e) locates associated ads which match the user-visitor relevancy factors and the ad relevancy terms; (f) merges the user-visitor relevant ads into the preformed web page; and (g) publishes the merged ad on the web space and to the user-visitor.

A content provider-user and a registered user log into the system and program 300 at function block 310. The system then notes the user profile and uses the predetermined relevancy factors stored with the user profile to locate relevant ads as discussed above. A non-registered user-visitor also travels through the system and, in decision step 312, the system and program determines whether the user-visitor has previously traversed the system by seeking to match previously stored IP addresses with the current IP address of the user-visitor. In one situation, IP addresses for all user-visitors are stored for a 24 hour period. Other storage times for IP addresses may be employed. The following Table shows data collected by the system and the program 300 to track the current session of the user-visitor through the system. This data is also stored for earlier used IP addresses.

| Non-Registered User-Visitor Session Capture Profile Table |
| --- |
| Current session history on System Server |
| Total current time on system site |
| Hits on page AA, BB |
| Time on content page AA |
| Time on page BB, etc. |
| User-visitor's location data based upon referral I.P. address, longitude-latitude geographic tags |
| Current session search |
| Referred by XX site |
| Referral count Q-refer |
| Posted content - this session |
| Type of content viewed this session |

Function block 314 turns on a "session record" or log function for the site visitor, whether a registered user, or a previous user-visitor or a new user-visitor. Session record employs the user profile (or an index thereto), and the former site session history for a previously recorded IP address user-visitor or opens a new record for the IP address of the new user-visitor. Function block 316 notes the user action on the system web site (multiple web pages on the same system server). This may be a search 318 or a category selection 320. See Categories Table B or Input Page Table C for user selections which are currently available. In any event, the system, in step 316, acts upon the user's input request. The reference, in FIG. 10, to system function ("sys. fnc.") indicates that the system is operating without the display of a web page to the user. System function branch 321 permits an upload of content ("cnt.") as described earlier in FIG. 1, and for example, permits a search over the system web site (multiple pages on the web site), or permits other functions ("etc.") to be activated by the user as noted in Table C above. System function 322 then operates on a content request to get a preformed web page associated with the requested content, or gets a web page associated with the search term input by the user or obtains a default web page. See FIG. 1, for example. A command ("cmd") is issued to the preformed web page database 324. Content A and Content B web pages are shown in FIG. 10. As an example, web page 325 has Content A thereon and "content ad space" 327 and "user ad space" 329 which, in the web page in database 324, are blank ad spaces. If the user conducts a search, the search results may list Content A. It should be noted that the preformed web page 325 may have some "static" or non-variable ads in it but, in the embodiment shown in FIG. 10, some variable or blank ad spaces 327, 329 permit the system and present method to insert more relevant ads into the preformed web page. Ads relevant to both the content and the user's history are located and inserted, typically sorted by referral fee pricing and payments.

System function 322 also issues a command to content relevant ad database 326. This is discussed above in detail. The preformed web page with variable ad spaces 327, 329 and the content relevant ad from database 326 is sent to the compiler for merger of the content ad with the preformed web page. See the double lines in FIG. 10.

The system and method then activates a user relevance engine 328. This relevance engine operates in much the same way as the earlier described relevance engines, but operates on the current session history for the user-visitor, and the user profile if the user is pre-registered, and the earlier, stored IP history if the user-visitor has earlier visited the web site (based on similar IP addresses) and earlier traversed the web site system. A command is sent to the user relevant database 330 and user-relevant ads are output therefrom as noted by the double lines to merger function 334. To enhance the revenue to the content provider (and the system operator), in the event several user relevant ads and or content relevant ads are initially selected, those ads must then be sorted and some deselected by a price discriminator ("discrim.") 332 which is used to select the highest paying ad, that is the ad with the highest sales referral fee. This is the highest priced ad from the relevant ads initially obtained from content ad database 326 and user relevant ad database 330. It should be noted that the price discriminator may be used with both content relevant ads and user relevant ads. FIG. 10 shows this selector only with user relevant ads.

As a further enhancement of the system and method, advertiser aggregators or ad networks have been created by third parties. These ad networks normally have prerequisites which a particular web site must meet before the ads stored in the ad networks are downloaded to a web site owned by the system operator. The following Tables show ad network criteria, examples of some current ad networks and the criteria for one of the ad networks.

---

Ad Network Requirements or Criteria Table

---

Minimum or maximum - page views/unique viewers
Geographic location
Content Type
Language
Contextual Relevancy
Viewer interests
Advertisement sizes (banner size)
Advertisement type (Video ad, widget, banner ad, survey)
Advertisement payment type (CPM, CPC, or CPA) (cost-per-click, or CPC; CPM, cost per thousand impressions; CPA, cost per action/acquisition).
Ad Network Example Table (referencing ad and web site requirements pages)

Vermedia: English speaking Christian viewers.
(http:- veremedia.com/publishers/requirements.htm)
Scanscout: Video content and a minimum of 1 million US only viewers per month.
(http:- www--scanscout.com/join_now.html)
Consorte Media: Hispanic viewers and CPC payments.
(http:- www--consortemedia.com/ad_network/signup.php)
Admob: Website must be viewed on the iPhone.
(http:- www--admob.com/s/home/register/?iphone=1)
Glam Media: Blog content that is women oriented and a minimum of 100,000 viewers per month.
(www--glammedia.com/publishers/glam_publisher_network/site_requirements.php)
VerMedia Ad Network Requirement Table Vermedia: English speaking Christian viewers.
All website content must be in English.
The website must attract a Christian or family-oriented audience.
The website must be rich in high quality content.
The website must not contain, produce or link to profane and/or adult content of any kind.
The website cannot contain or be related to anything illegal in nature. This includes but is not limited to web sites promoting mp3, warez, EMU, ROM, or any other form of illegal products or content

---

In order to meet the criteria for a particular ad network, the present system uses the user profile, the prior session history of non-registered users and the current session history of the user-visitor. These session histories permit the present system and method to locate and insert more relevant ads into the preformed web page. Further, the present system and method permits the system to qualify for certain ad networks since the system operator knows what type of user is currently traversing or visiting the system site and knows what content is of interest to the current user-visitor. In addition to the session histories (from the user's profile, from the stored IP address profile and from the current session history), the system determines the type of content the user-visitor is currently interested in by the current and past session histories. The user-visitor content type also provides relevancy factors which directly affect the type of ad and ad network which delivers relevant ads to the preformed page and, more particularly, to the variable ad space for content ads 327 and user relevant ads 329. The Viewer Content Type Table which follows provides and example of the content type which is used by the ad networks and by the system to select the most relevant ad to the user-visitor and the highest paying referral ad for the content provider.

---

Non-Registered User-Visitor-Viewer Content Type Table

---

Blog(s) viewed - this session
high volume content viewer indicates visitor more interested in information rather than people; this is "not social" viwer.
Blog comments posted - this session
High volume comment provider equals "social" viewer
Links uploaded with Comment-Commentary - this session
Pictures viewed
Pictures uploaded - this session
Videos viewed
Videos uploaded - this session
Linking history this session
Links uploaded - this session
Widgets used and/or uploaded - this session
Views of Other Person's Profiles on System indicates "social" viewer

---

Once the relevant content ads and the relevant user ads are selected, and the highest paying ads are selected, the system and method in step 334 merges the ads into the preformed web page carrying the Content A. Step 336 is a display or publishing step wherein merged web page 335 is displayed to the user. Web page 335 includes Content A, content relevant ad or advertisements 337 (multiple ads are typically shown) and user relevant ads, shown in space 339. As noted in FIG. 10, the system operates the revenue program and operates the content upload program (if the user-visitor wants to add supplemental content to the web page 335). The revenue program is operated if the user-visitor clicks though the hyperlink in the ad display for the user relevant or content relevant ad in spaces 337,339. In step 338, the system updates the user session log.

In steps 340-352, the system repeats the earlier processes. Step 340 notes the user's action on the web site and updates the user session log based thereon. If the user-visitor looks at many other user profiles (see Content Type Table above), then the system notes this user-visitor behavior and serves up more social site related content or user relevant ads. In other words, the type of content viewed and added to the system operator web step also provides a relevancy factor or factors about what the user is interested in. These relevancy factors are used to serve up or insert, into the preformed web page, more relevant ads hopefully of interest to the user. Step 342 activates the content page database. See system function branch 321. In step 344, the system activates the content relevant ad database. In step 344, the system activates the user relevant ad database. Of course, the relevancy engines described earlier are activated as part of the utilization of the databases 324, 326, 330. Step 348 merges the relevant content-based ads and relevant user-based ads into the performed web page with the newly selected Content B. In step 350, the system publishes, with a publisher, the newly formed and merged web page to the user-visitor. Step 352 repeats the earlier steps in an effort to maximize referral ad revenue to the content provider and to the system operator. In this manner, the system and method has a double relevancy ad engine which is based upon content provided and content selected and based upon current and past site session histories of the user-visitor.

Figure 11:
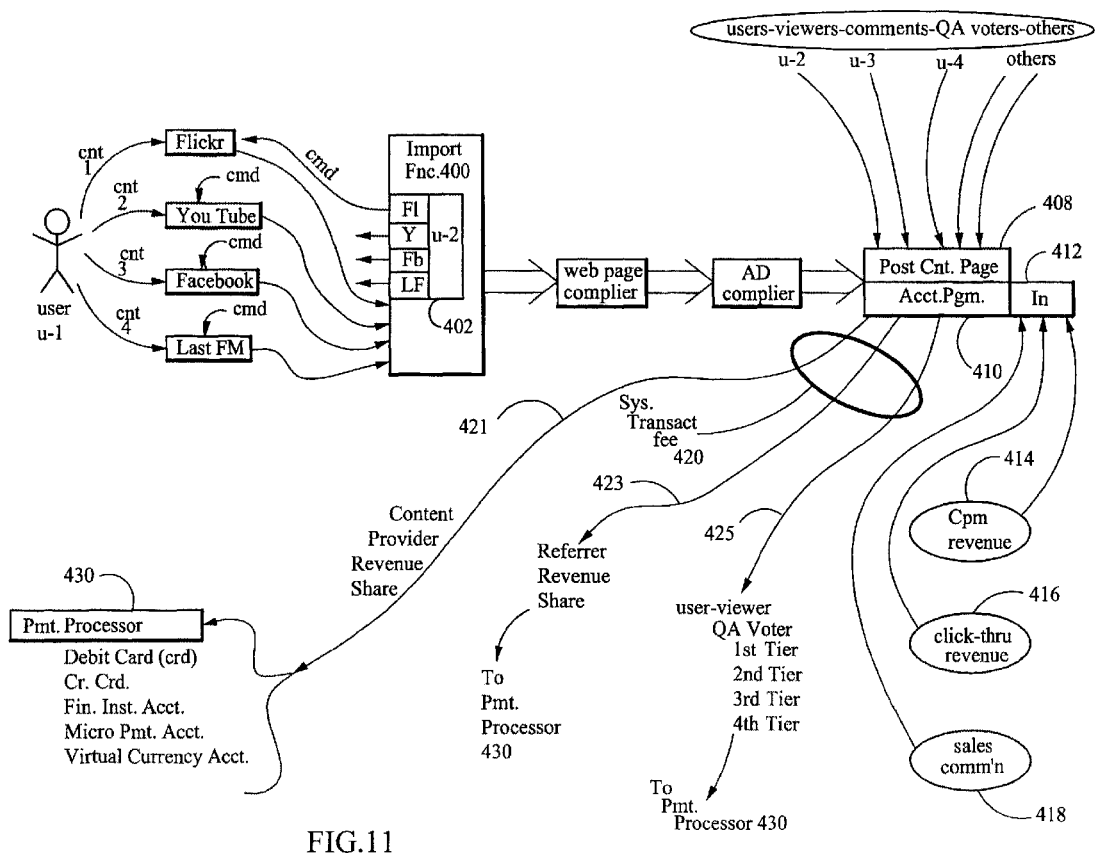
FIG. 11 is a process flow chart showing functional modules or sub-systems for (i) automatic importation of user-controlled content from third party web sites; (ii) multiple users, viewers, and registered users posting QA ratings or votes and comments; (iii) revenue sources input (IN) the computer-based system; (iv) transaction fee module; and (v) payment processors.

FIG. 11 diagrammatically illustrates a process flow chart and functional modules for uploading third party content web site wherein user controlled content is uploaded, in an automatic manner, via an import function 400 into the system described earlier. Further, FIG. 11 shows several types of users-visitors, some registered and some unregistered users, viewing the posted or published web page, generating click through and sales commission revenues as well as payment processing modules that permit the users to withdraw earnings from their accounts. User U1 independently uploads content cnt1, cnt2, cnt3 and cnt4 to various third party web sites which, as an example herein, include Flickr; YouTube; Facebook; and Lastfm. Import function 400, being a module in the system (see system 223, in FIG. 8), issues upload commands cmd unique to each third party web site. Therefore, in general, the User U1 profile will include tokens or control keys for Flickr, designated as command cmd-Fl, in FIG. 11, YouTube command Y, Facebook command FB and Lastfm command LF. These third party web sites must download the content provider controlled content cnt1, 2, 3 and 4 due to the control tokens ultimately authorized by content provider-user U1. User profile U1 402 is generally identified in import function 400 block.

The output from input function block 400 leads to web page compiler 404 and ad compiler 406. These functional blocks are described earlier in connection with FIGS. 1-10. Ultimately, the compiled or merged web page is posted or published on the Internet at a particular Internet address. Publisher function block 408 indicates that the content is posted as a "cnt page."

Various users, some registered and some unregistered, view the content page 408. These users-visitors are identified as U2, 3, 4 and others. Some of these users are registered and the registered users may post comments cmt on the content page 408. Other users have quality approval rating tokens or QA tokens which may be posted on particular content on that published web page. This is discussed later in conjunction with FIG. 13. The accounting program module 410 carefully monitors the user-visitor interaction with content page 408. A tracking monitor is used. Some of the users-visitors click on display advertisements on content page 408 resulting in the user being transferred a corresponding advertiser designated web site. The user-visitor employs and operates a hyperlink on the display ad on content page 408. The revenue input function 412 shows that the system obtains click per impression cpm revenue 414, click through revenue 416 and sales commission revenue 418. From revenue input module 412, account program 410 handles and shares this revenue between various participants in the system. For example, the system operator has a transaction fee module 420 which processes paths 421, 423, 425 which show revenue sharing of the input revenues into account program 410, 412. Revenue share 421 is dedicated to the content provider via a first fee sharing module. Payment processor 430 enables the content provider user to withdraw earnings from account program 410 via a designated debit card, credit card, or to deposit the earnings into a financial institution account, a micro payment account or a virtual currency account. The following Payment and Payment Processor Option Table shows various payment actions by the system.

Payment and Payment Processor Option Table

System Condition:
  A. Account exceeds $x (e.g., $25.00)
  B. User initializes third party payment processor input profile and processor accepts user data and revenue sharing protocol.
Third Party Payment Processors
  debit card, linked to financial institution (e.g., bank, brokerage)
  smart card (on-board memory) linked to fin. inst.
  payment toward credit card account
  cell phone account
  Pay Pal or other Internet-based payment processor micro payment processors (Con tenture, Allo pass, Jupiter media, etc.)
  virtual currency processors (zynge, SGN (social gaming network))

Revenue sharing portion 423 is designated as the referral revenue share and ultimately the referral revenue share is also sent to payment processor 430. Another fee sharing module is used to compensate persons who refer the content provider U-1 to the system. Revenue path 425 is dedicated to one or more user-viewers who are quality approval QA voters. Another fee sharing module is used to compensate QA user-voters. As explained later, the QA voters may be grouped in tiers such as a first tier, second, third and fourth tier or may be compensated on a singular basis.

In addition to the User Profile Table discussed above in connection with FIG. 1, the user has access to an Account display as part of his or her profile. The Account display, in one embodiment, includes an Earnings Table and a Balance Sheet Table.

Account - Earnings Table

View History: All Time
(alternative: 30, 60, 90 days)                                       Current Rate: $0.82

| | Views | Average Rate | Earnings |
|---|---|---|---|
| 1.0 All Content | 4793 | $0.99 | $4.76 |
| 1.1 Blogs <Top> | 179 | $0.99 | $0.17 |
| 1.1.1 "Red Gage Rocks" | 63 | $0.99 | $0.06 |
| 1.1.2 "Neodymium magnets: Beware" | 35 | $0.99 | $0.03 |
| 1.1.3 "Dragon Letter art" | 49 | $1.00 | $0.04 |

-continued

| | | | | |
|---|---|---|---|---|
| 1.1.4 "PEOPLE" | 13 | $1.00 | $ | 0.01 |
| 1.1.5 "Moore says.." | 11 | $1.00 | $ | 0.01 |
| 1.2 Photos <Top> | 3258 | $0.99 | $ | 3.24 |
| 1.3 Videos <Top> | 68 | $1.00 | $ | 0.06 |
| 1.4 Documents <Top> | 0 | $0.00 | $ | 0.00 |
| 1.5 Links <Top> | 1288 | $0.99 | $ | 1.28 |
| 2.0 Total Earnings: | | | $ | 4.76 |
| 3.0 Feature Bonus Earnings: | | | | |
| 3.1 Home Page | 2Mcpm | $.0001/cpm | $200 | |
| 3.2 Content Segment Page | xx | xx | xx | |
| 4.0 Transfer - as User Tip | — | — | $ | 0.50 |
| 5.0 Transfer - as User Payment | — | — | $ | 10.00 |
| 6.0 Charity Share | — | 10% total | −$ | 21.05 |
| 7.0 Contest Date mm, dd, yr | | | xx | |
| 8.0 On Site Activity Level Bonus | | | | |
| 8.1 Monthly views (current affinity points 350; threshold needed 500) | | | -0- | |
| 8.2 Monthly content postings (posts 4; level revenue share Rev1) | | | $ | 2.00 |
| 8.3 Monthly Frequency Posting Quality Rankings (4 posts; thres. 8; level 0) | | | -0- | |
| 9.0 Earnings Plus Bonus | | | $196.21 | |

Account - Balance Sheet Table

View History: All Time
(alternative: 30, 60, 90 days)
Available Balance $4.76    Withdraw $mm.nn ($15.00 min'm w/d; $25.00 min'm bal.)

| | Description | Type | Status | Amount (debit/cr) | Balance |
|---|---|---|---|---|---|
| May 01, 2009 | Monthly Earnings | dep | clear | 4.40 | 4.76 |
| Apr. 29, 2009 | Bonus earn | dep | pending | 0.25 | 4.76 |
| Apr. 18, 2009 | tip to Member AW | w/d | clear | 12.24 | 4.76 |
| Apr. 15, 2009 | debit card | w/d | clear | 14.25 | 17.00 |
| Apr. 15, 2009 | transact fee | w/d | clear | 0.75 | 31.25 |
| Mar. 01, 2009 | Monthly Earnings | dep | clear | 10.25 | 32.00 |
| Mar. 01, 2009 | Bonus earn | dep | clear | 5.75 | 21.75 |
| Feb. 01, 2009 | Monthly Earnings | dep | clear | 10.25 | 16.00 |
| Feb. 01, 2009 | Bonus earn | dep | clear | 5.75 | 5.75 |
| Jan. 01, 2009 | Monthly Earnings | dep | clear | -0- | -0- |
| Jan. 01, 2009 | Bonus earn | dep | clear | -0- | -0- |

The Account Earnings Table enables the user to select a "view history" which may encompass the entire account time or, alternatively, a selectable period of 30, 60 or 90 days. Of course, based upon space, the displayed history may be limited to a predetermined period of time. The Account Earnings Table also shows a current rate or cpm or impression per thousand value, sometimes called clicks per thousand. In other words, if 1000 users-viewers see the content for content provider user U1 and click through on an hyperlink from a display ad to an advertiser designated web site, one cpm is counted by the system. If 9000 users-viewers click on the ad hyperlink, 9 cpm is tracked by the system. As is known, advertisers pay for click through advertising, sometimes called "sales referral fees" herein, based upon cpm or clicks per thousand. Returning to the Account Earnings Table, the current rate of $0.82 is the average cpm for all content posted by user U1 and accounted for in the Account Table section row 1.0 through 2.0. In use, the Account Table does not include section row indicia 1.0, 1.1, etc.

The Account Earnings Table, in one embodiment, shows all content, the cpm values, and the average cpm rate for the itemized content. The content category is further subdivided into 1.1 blogs, 1.2 photos, 1.3 videos, 1.4 documents and 1.5 links. The user may select an appropriate display command to show all blogs under blogs 1.1 such that all the listed blogs are identified. For example, the user U1 maintains a "red gage rocks" blog 1.1.1 and a different "people" blog 1.1.4. Item 2.0 in the Account Earnings Table is the total earnings. Section 3.0 of the Account Earning Table is a listing of all feature or bonus earnings. Row or section 3.1 indicates that the user U1 has content on the homepage for the overall system web site. The system operator assigns a bonus for content displayed on the system homepage. The Account shows views of 2 million cpm at $0.0001/cpm resulting in earnings of $200.00. Row 3.2 in the Account Earnings Table shows that the content may be on a "segment" or category page. A segment may be "automobiles" as compared to "music" or other general entertainment category. Row 4.0 lists any transfers that are made from one registered user to another registered user and these 4.0 transfers are called "tips". Row 5.0 is a transfer direct from one user to another user. Row 6.0 is a charity share which the user elects to pay a designated charity from his or her cpm earnings, typically for a certain content page. User U1 may designate that all future bonus earnings be subject to a 10% charity share such that the earnings within the "future bonus earnings" group, that is, 10% of those earnings, are dedicated and transferred to a designated charity of his or her choice. Single content may also be selected. The published "charity" content pages will be uniquely marked as "charity donation" on the designated published web page to drive addition traffic therethrough. Row 7.0 shows earnings from a contest, which, in one embodiment, is designated by a contest opening date, month, day and year. Section 8.0 lists on site activity level bonuses. Typically, these may be considered affinity rewards or bonuses based upon the user being a viewer rather than a content provider on the web site. Row 8.1 shows monthly views for User U-1 and the current affinity point value and the threshold value needed to achieve a certain predetermined dollar or compensation bonus. The dollar bonus for the monthly viewers is set by the system operator in its discretion. Row 8.2 is a monthly content posting count (quantity). In this situation, user U1 has posted 4 content pages in the current month which is set at revenue level share Rev1. A $2 bonus is paid by the system operator for at that revenue share level. If higher cnt postings are made by user U1, at certain predetermined thresholds, higher bonus levels are paid. For example, the revenue share bonus level Rev2 may be $10.00 and revenue share level Rev3 may be $20.00.

Row 8.3 is a monthly frequency posting quality rating QA token count. In one example, each registered user has 5 QA tokens which the user may post and/or withdraw from any content on a particular published web site. In the Account Earnings Table, the user has posted 4 QA tokens this month. He has one QA token in his account which is not assigned to content. The threshold level, set in the discretion of the system operator, is 8 QA postings per month. Therefore, the user has not achieved the monthly frequency threshold. If the user posted all 5 QA tokens, and then withdrew and re-posted 3 tokens, he would reach threshold level 1 (8 QA postings) and get, for example, a $2.00 bonus from the system operator.

The row designators 1.0 to 9.0 are not shown in the user Account display.

The Account Balance Sheet Table listed above also shows the time frame which is selectable by the user, the user's available balance and the withdraw request threshold amount shown as $mm.nn. In the current embodiment, there is a $15.00 minimum withdrawal threshold and a requirement that the user must have an account balance which exceeds $25.00 in order to withdraw or transfer any money to payment processor 430. The description, type, status, amount and balance is shown in the Account Balance Sheet Table. Entries Jan. 1, 2009 shows zero (-0-) amount for monthly earnings and bonus earnings. The Feb. 1, 2009 monthly earnings and bonus earnings show credits of $10.25 and $5.75. On April 14, the user has transferred money from the system account for U-1 and withdrawn $15.00 worth of earnings, paid to the designated payment processor. Currently, the payment processor is a debit card tied to a financial institution. The withdrawal of the $15.00, less the system transaction fee of $0.75, is sent to the financial institution maintaining the debit card for user U-1. The entry of Apr. 18, 2009 shows that user U-1 has transferred a tip to member AW of $12.24. Accordingly, member AW account has a credit of $12.24. The Apr. 29, 2009 entry for bonus earnings is pending since those earnings have been posted but not yet received by the system operator in the amount of $0.25. When the status of bonus earnings for April 29 changes from pending to clear, the $0.25 will be added to the balance to show a "cleared" balance.

Figure 12:
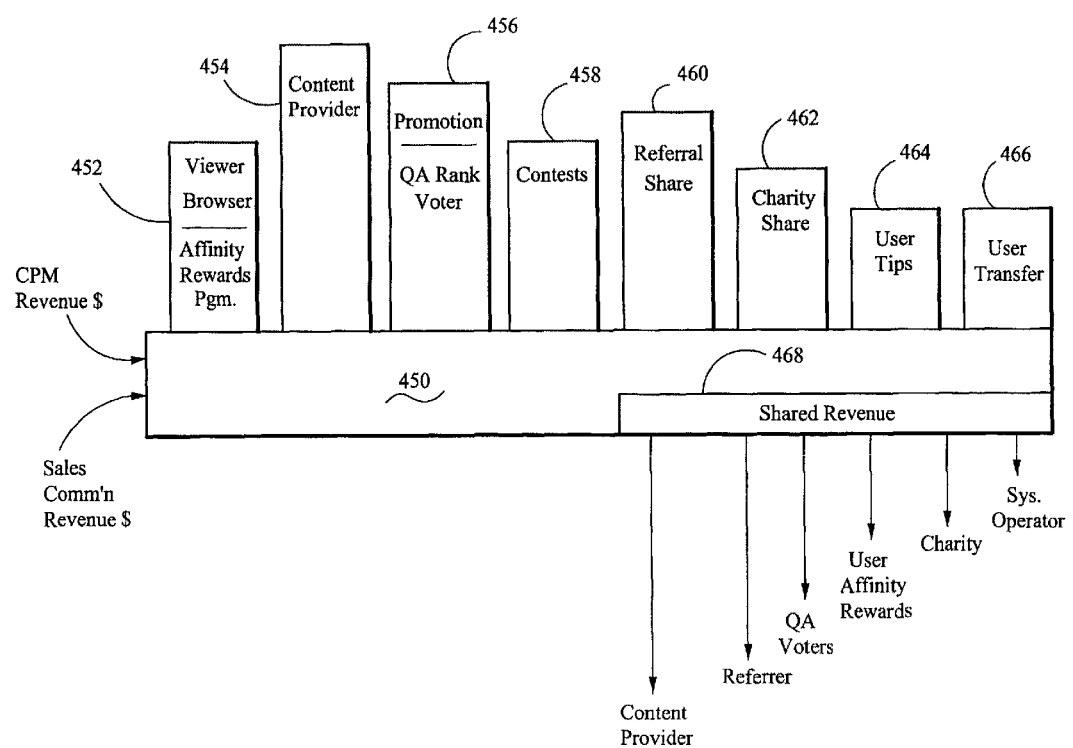
FIG. 12 shows incentive categories generating views measured in cpm (clicks per 1000) and shared revenue the content provider, QA voters, the system operator, and others.

FIG. 12 diagrammatically illustrates multiple incentives provided for sharing the cpm revenue, those incentives given to viewers in the form of affinity rewards or loyalty rewards, to content provider users, to voters for quality approval QA posting, to users participating in contests, to users who refer other users to the system, to charity, to tips transferred from one registered user to another registered user and to simple transfers on account from one user to another. Cpm revenue and sales commission revenue enter the system 450 at one end. Affinity rewards or loyalty rewards functional module 452 enhances the viewing frequency and provides an incentive to users and viewers to become registered users. Simply viewing content by a registered user may trigger a loyalty reward. The on site activity level bonus in the Account Earnings Table provides some indication of an affinity reward program. Content provider incentive module 454 is discussed earlier. Promotion incentive functional block 456 provides a registered user with the ability to post QA tokens or rankings on selected content. Contest functional block 458 enables a registered user to obtain additional rewards, prizes and potential earnings from contests maintained by the system operator. For example, the contest may include rules such as everyone who posts any content of any nature within a one month period has a "contest ticket" randomly assigned to his or her account. At the end of the month, the system operator will randomly select one the contest ticket and award a money bonus or something else of value.

The referrer share incentive function 460 indicates that registered users who refer other registered users to participate in the system are rewarded. This incentive is discussed earlier. Charity share function 462 enables a content provider or other registered user to dedicate a certain percentage of sales referral fees from designated content to be sent to a user designated charity. To further incentivize viewers and content providers, content web sites are marked with a display indicating that certain revenues are shared with a designated charity. Function blocks 464 and 466 list transfer payments from one user to another user. Block 464 is a "tip transfer" similar to a tip given from a patron to a waiter or waitress, that is, from one registered user to another registered user. Function 466 is a transfer module enabling one registered user to transfer some or all of his or her earnings to another registered user. Revenue sharing module 468 indicates that cpm revenue and sale commission revenue input into system 450 is shared by content providers, persons referring the content providers to the system, registered users who place QA tokens, sometimes called QA voters, and user affinity rewards. Charities also share revenue. The system operator collects processing fees from all these actions.

The shared associated sales referral fee with the content provider-user is based upon a predetermined formula. The formula or algorithm can account for various factors including: the supplied content (e.g, if the content is high quality of a long video, then the shared revenue from the system operator may be higher compared to a single 3 sentence blog entry), a gross value of the associated sales referral fees set by the corresponding advertiser designated web site (how much cpm is the system operator paid and is the cpm to the system operator above a certain minimum amount), the frequency at which the content provider posts other content either directly or through automatic third party web site uploads (frequency of posting), a predetermined user-visitor profile (if the user-visitor is a highly regarded critic who posts a favorable comment, the content provider share of revenue may be increased (e.g., the New York Times food critic posts a favorable comment on a recipe blog entry posted by a content provider)), a predetermined user-visitor group profile (e.g., any posting from the Rolling Stones magazine), a user-visitor referral source (a user referred by a well connected referral source may increase the content value), the number of user-visitors who go to the published web page with the supplied content (total visitors times the cpm, maybe with threshold steps which increase the cpm share paid to the content provider (or decrease)), a time of visit factor per user-viewer (the longer time users stay on the content site indicates higher quality), per visit time on site or an aggregate thereof for each user-visitor who goes to the published web page with the supplied content, a frequency of return to the published web page with the supplied content for each user-visitor who returns to the published web page with the supplied content. The content provider shared formula may include all or a portion of these factors.

The formula for sharing associated sales referral fee with the user-QA voter, a registered user-visitor who post quality tokens on quality branded content, is also based upon a predetermined quality ranking formula accounting for various factors. Some of these factors are discussed above in connection with the content provider formula. The factors in the QA shared revenue formula are: the total number or quantity of posted tokens on quality branded content, the user's frequency of posting quality tokens on QA branded content, the gross value of the associated sales referral fee set by the advertiser designated web site, the sequential order of posting the QA token by registered user-visitor compared time-wise with other QA voters, the registered user-visitor's profile (if the user is a well known critic, the user gets a higher share when the well known critic posts a comment on the content), the registered user-visitor's group profile (e.g., any QA post from the Rolling Stones magazine), the shared sales referral fee dedicated to the content provider who supplied the branded content, the number of user-visitors who go to the published web page, a time of visit factor (when does the user post the QA token), tokens per visit by the user-visitor or an aggregate of QA postings over a set period of time (e.g., 12 QA postings in 24 hours of the content post date results in a higher QA shared return to the QA poster-voters and the content provider than "slower" QA branding on other content), the number of user-visitors who go to the published web page with the supplied content, a frequency of return to the published web page, for each user-visitor and each user-voter group.

Figure 13:
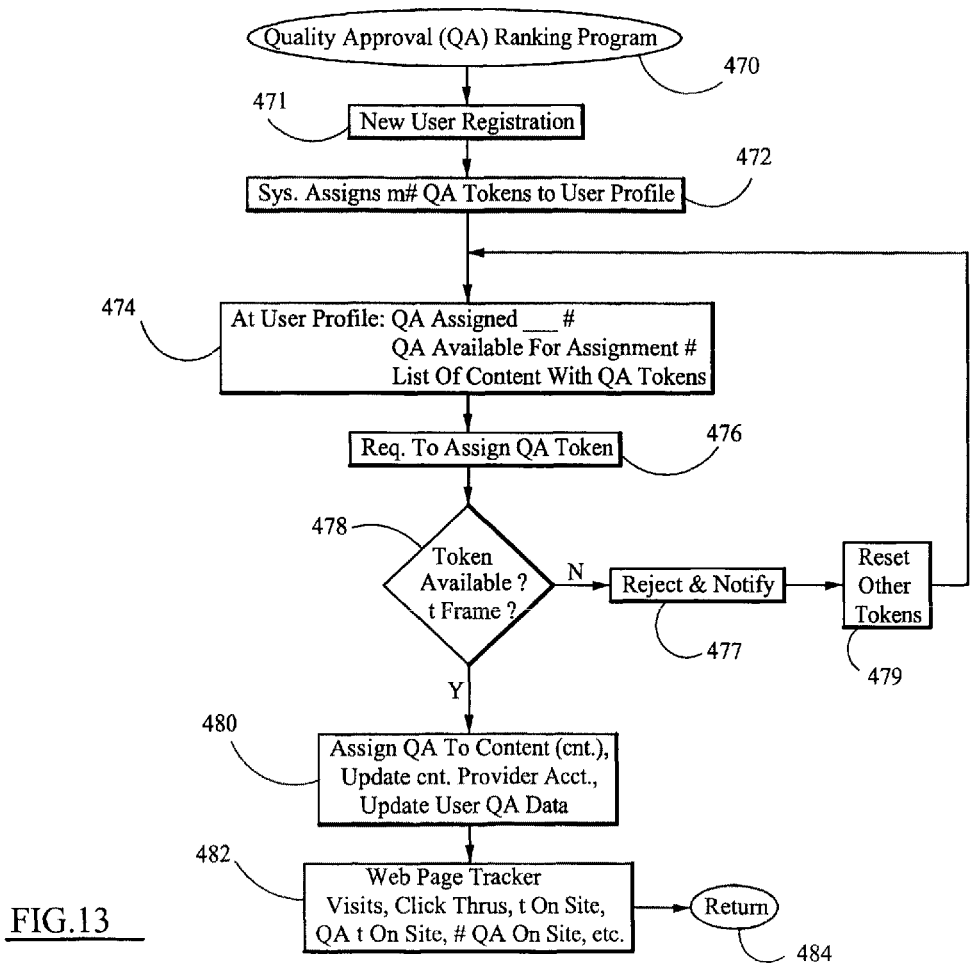
FIG. 13 shows the Quality Approval or QA Ranking Program.

FIG. 13 diagrammatically illustrates the quality approval QA ranking program 470. Step 471 indicates that a new user registers with the system and completes the user profile. As part of the completion of the user profile, step 472 has a functional block wherein the system assigns a certain predetermined number m QA tokens to the user. Step 474 displays, in the user profile, the number of QA tokens assigned, the number QA tokens available for assignment, and also a list of content which currently has been designated as quality approved QA by user U-1. Step 476 is a request (req.) by user U-1 to assign one or more QA tokens to a certain designated web site. Decision 478 determines whether the user has tokens available for assignment (has the user assigned all m tokens?) and determines whether the QA token assignment is permitted within at time frame. The current embodiment of the invention does not have at time frame lock once a QA token is assigned to content. Another embodiment of the invention may require that once a QA token is assigned to designated content by a user, the token must remain on the content for a predetermined t period of time, for example, one hour, twenty-four hours or thirty days. If the decision block 478 is negative, the NO branch is taken and step 477 issues a rejection of the token assignment request and notifies the user of the same. Reset function 479 resets other tokens in the user profile. If the YES branch is taken from decision step 478, in step 480, the system assigns the QA token to the content and updates the content provider's account, indicating that a quality assignment QA has been made by a user and also updates a user's QA data in the user profile. Step 482 is a web page tracker which monitors the number of visitors on the web site, the number of clicks from ads on the web site, the time each visitor stays on the web site, the number of QA tokens on the site, the length of time each QA token stays on the site and other items discussed above. With respect to a singular user U-1 who has posted a token QA on a web site, that user, in the current embodiment, would be compensated with a share of the sales referral fees during the time the user U-1 QA token is on the site. Once the user takes the token off the content on the published web site, the revenue U-1 share for that QA token ends.

The incentive permits each registered user to quality approve QA one or more pieces of content on the website and the economic value of that action is set forth in the following Table A and B. The User Viewer Early Quality Approving Voters-Influence Reward Table A shows events at certain time periods t1, t2, t3 and t4. All numbers are examples since actual cpm values are set by advertisers.

User-Viewer Early Quality Approving Voters - Influence Reward Table A

| | Time | | | |
|---|---|---|---|---|
| | t1 | t2 | t3 | t4 (t1 before t2 > t3 > t4) |
| Viewer Count in cpm | .001 | 5 | 10 | 150 |
| Creator cpm value example 2.1 | base m 1.00/cpm | decr. n 1.20 | decr. o 1.44 | decr. p (m > n > o > p) 1.728 |
| ex. Content Creator %* | 100% | 90 | 80 | 70 |
| ex. Content Creator cpm | 1.00 | 1.08 | 1.152 | 1.2096 |
| ex. $ to Content Creator | 0.001 | 5.40 | 11.52 | 181.44 |
| Sequence of Qual. Rank | -none- | QA V1 | QA V2 | QA V3 |
| Total QA Voter share %* | -0- | 10% | 20% | 30% |
| Total QA Voter cpm | -0- | 0.12 | 0.288 | 0.5184 |
| QA V1 share of V total % | -0- | 100% | 90 | 80 |
| QA Voter V1 cpm | -0- | 0.12 | 0.2592 | 0.41472 |
| QA V2 share of V total % | -0- | -0- | 10% | 12 |
| QA Voter V2 cpm | -0- | -0- | 0.0288 | 0.062208 |
| QA V3 share of V total % | -0- | -0- | -0- | 8% |
| QA Voter V3 cpm | -0- | -0- | -0- | 0.041472 |
| $ to QA Voter V3 | — | — | — | 6.2208 |

*The amount allocated by the System Operator to be dedicated to payment of content providers, quality voters and others, in the sole discretion of the System Operator, not the total cpm click-through ad revenue received by the System Operator.

At time t1, there is only one viewer noted on the published web site with the merged content. Therefore, the cpm viewer count is 0.001. At time t2, the cpm count is 5 cpm equivalent to 5000 viewers. Therefore, at time t4, 150,000 users have viewed the published web page. The creator has been assigned a cpm value by the system operator as example ("ex.") 1.00; 1.09; 1.152; 1.2096 and the system operator cpm is 1.00; 1.20; 1.44; 1.728 for all compensated parties. The cpm value has some relationship to the sale referral fees paid by the third party advertisers to the system operator. However, the system operator establishes the content provider or creator cpm and, further, establishes the referral revenue sharing rate or percentage as a QA token incentive rate or percentage. The creator cpm may decrease in amount from m, n, o, and the smallest amount p is based upon increasing thresholds of cpm viewers. In example 2.1, $1.00 cpm is dedicated by the system operator as the total incentive cpm payment for all compensated parties, herein the content creator and the QA voters. See t1 time. At 5 cpm, the dedicated "compensated party" incentive is $1.20 and over 100 cpm, the dedicated cpm is 1.728. To incentivize the QA voters or users applying quality approval QA tokens, the creator share of the sale referral fees decreases from 100% at time t1 to 70% at time t4. However, since there are far greater viewers (150 cpm) at time t4, the earnings to the creator are $181.44 even though the creator or content provider share is 70% of the incentive dedicated cpm at 1.728. In order to incentivize registered users who are early voters (early adopters), the proposed system gives a much higher revenue share percentage to early QA voters as compared with later QA voters. The sequence of quality voter rankings is 0 at time t1 (no voters), at time t2 there is only one QA voter V1, at time t3 there is a second QA voter V2 and at time t4 there is a third QA voter V3. Voter QA V1 has a 10% share of the total cpm allocated to the incentive program at time t2. At time t3, the "incentive pool" cpm has increased to $1.44 and the allocation to the creator is 80% of the "shared incentive revenue" from the system operator and the remaining 20% at time t3 is allocated to all QA voters at that time-based tier. At time t3, user QA V1 receives 90% of the QA share (90% of $0.288) and user QA V2 receives 10% of the total QA voter share (0.288). At time t4, a third user has voted as QA V3 and the creator content share of the incentive pool cpm is 70% (70% of 1.728) and the total voter share for the cpm revenue is 30% (see 0.5184). The total QA voter share is split between QA V1 with a share of 80%, QA V2 with a share of 12%, and QA V3 with a share of 8%.

User-Viewer Early Quality Approving Voter Tiers - Influence Reward Table B

|  | Time | | | |
| --- | --- | --- | --- | --- |
|  | t1a | t2b | t3c | t4d |
| Viewer Count in cpm | .001 | 5 | 10 | 150 |
| Sequential Qual. Rank example Voter Tier levels |  | voter A tier <10 | B tier 11-20 | C tier 21-30 ($0 > 30 V) |
| Total QA Voter share % | -0- | 10% | 20% | 30% |
| Total QA Voter cpm | -0- | 0.12 | 0.288 | 0.5184 |
| QA V1-A share of V total % | -0- | 10% | 9 | 8 |
| QA V2-A share of V total % etc. to V10-A | -0- | 10% | 9 | 8 |
| QA Voter V1-A cpm | -0- | 0.012 | 0.02592 | 0.041472 |
| QA Voter V2-A cpm etc. to V10-A | -0- | 0.012 | 0.02592 | 0.041472 |
| QA V1-B share of V total % | -0- | -0- | 1% | 1.2 |
| QA Voter V1-B cpm | -0- | -0- | 0.00288 | 0.0062208 |
| QA V2-B share of V total % | -0- | -0- | 1% | 1.2 |
| QA Voter V2-B cpm | -0- | -0- | 0.00288 | 0.0062208 |
| QA V1-C share of V total % | -0- | -0- | -0- | 0.8% |
| QA Voter V1-C cpm | -0- | -0- | -0- | 0.0041472 |
| QA V2-C share of V total % | -0- | -0- | -0- | 0.8% |
| QA Voter V2-C cpm | -0- | -0- | -0- | 0.0041472 |

The User-Viewer Early Quality Approving Voter Tiers-Influence Reward Table B shows the results when the users are grouped into quantity-based tiers of voters. In this example, each tier has 10 voters. Table A is a sequence time-based revenue sharing plan. Therefore, at time t2b, there are 10 QA voters or less. At time t3c there are 11-20 QA voters and at time t4d there are 21-30 QA voters. The total QA voter incentive share is tiered at 10% at t2b, 20% at t3c and 30% at t4d. However, since there are 10 voters in each tier, the first tier A users QA V1-A through QA V10-A, the first 10 QA voters (tier A), each receive 10% of the total QA incentive voter share of 10% (10% of $0.12). Therefore, if all the QA voters are assigned in the first tier at $0.12 cpm, then each QA voter in tier A receives $0.012 cpm. With tier B at time t2b, the first tier A receives 9% of the QA incentive pool (0.288) and the second tier listed by QA V1-B and QA V2-B each receives 1% of the pool. Tier B includes voters QA V1-B to QA V10-B. At time t4d, the first tier voters QA V1-A, QA V2-A each receive 8% of the total voting compensation share and the second tier of voters QA V1-B and QA V2-B each receive 1.2% and the third tier QA V1-C and QA V2-C each receive 0.8% of the voter cpm. Other incentive programs and algorithms and formulas may be employed to provide an incentive to user viewers to post QA tokens on content. If any QA voter removes his QA token, all sequential followers move up in revenue share rank. Alternatively, the sequence time compensation may be fixed and the system operator may retain the withdrawn incentive payment. Of course, the third party advertisers reward content providers who achieve high quality approval QA rankings. For example, the system operator may have a "vote open" time window which subsequently closes and therefore incentivizes early voters. Further, the system operator could have a blackout period (no votes accepted) or timeout period such that the QA token on a particular content would be removed after a certain period of time. For example, the timeout function may remove a QA token after 30 days. This timeout function clears some "dead weight" QA ratings and further enables and incentivizes the user viewers to repost the tokens. Additionally, the system operator may require that content maintain a certain cpm for a certain period (10 cpm) over a 7 day period before any QA token may be posted. The reverse may apply in that QA tokens may not be posted if cpm exceeds 1,000 cpm. Further, rather than having QA voters stacked in stepwise tiers as noted in Influence Reward Table B, the QA voters could be individually and incrementally increased in rewards more like Influence Reward Table A. Various mathematical models may be employed to incentivize QA voters, content providers and referrer users. The number of QA voters rewarded may be set or changed by the system operator. The following Graduated Ranking Table shows a different type of ranking.

Graduated Ranking Table

User-Viewer Profile
   Quality Approval ("QA") markers assigned ----- $
   QA markers available for assignment ---- $
   Graduated scale for each QA marker
     A - 4 points
     B - 3 points
     C - 2 points
     D - 1 points
   Average assigned QA value _____
   Content Listings
     QA - A    hyperlink content web page AA-1
                         Change - delete -
     QA - C    hyperlink content web page AA-3
                         Change - delete -

The QA tokens discussed in Table A and B above are single value tokens. However, the tokens themselves may have a graduated scale, for example, each QA token may have a graduated value A thru D. A QA token graded A may carry 4 points whereas a QA token grade D is assigned 1 point. Therefore, the user-viewer posting the QA token has more control or can "fine tune" his or her quality assignment QA to the content. In other words, if the user-viewer has five tokens, each worth a graduated scale A, B, C and D, the user can post first token grade A, second token grade C, third token grade D, and forth token grade D, and fifth token grade D, indicating that the user is critical of all content on the site so the average "grade" of QA tokens is D. The action may be tracked in the User Profile and the system operator may adjust other factors effecting earnings accordingly. The Graduated Ranking Table above shows that the user profile may list the content which the user has applied his or her tokens and may list the grade of each token assigned.

FIG. 14 diagrammatically shows the Account Maintenance Program. The left column in the Account Maintenance Program indicates an action, the second column indicates the effect on the content and the third column on the right indicates the accounting process. In the first row, the user, as a content provider, registers with the system. The effect on the content (center column) refers to the function that the content is uploaded through the upload module and further that this upload occurs automatically from the third party site. The system stores the upload approved key token from the user content provider. From the account process column, the user initializes the payment account and payment processor. Currently, the payment processor is a debit card tied electronically to a financial institution. Earnings from a user's account can be transferred to debit card by an electronic command from the user. Thereafter, the earnings are transferred to the financial institution who issued the debit card. The user can then access money from the debit card thereby monetizing the content, the referral fees, and the user QA incentives.

The second row shows an action from a third party site wherein the effect on content is an automatic upload of content from the third party site. The fourth row notes that the system operates and posts content with relevant ads on the system web site. The account process for the post content step increments the content provider user profile. The next action involves other users or other content providers and the effect on the content is to view the content on the published web page, to post links on the published content, to assign QA quality approval tokens or rankings to the content and to promote other content providers to post comments on the published web page. The account process increments the content provider's profile as well as increments the QA voter-user profile and the comment provider profile. In the next action, the system accumulates click through ad revenue and sale commission revenue based upon the performance of the content in the Internet marketplace. The account process enables the system to update the content provider earnings table and update the referral earnings table and update the QA voter-user earnings table. The next action involves the system and the content provider account or referral account or QA voter-user account and, particularly, indicates an action when the earnings account exceeds an account threshold. In one embodiment, the earnings disbursal account threshold is $25.00. The effect on content is to email or otherwise notice the content provider, QA voter etc. The account process enables the content provider or QA voter to transfer money from the earnings account to the identified payment processor. The last action in the last row indicates the system has no effect on the content but, the account process resets the content provider account value and all other account values to reflect transfer out of the earnings to the payment processor.

General System Description

The following Abbreviations Table lists items shown in the drawings and explained above.

Abbreviations Table

| | |
|---|---|
| acct | account |
| ad | advertisement |
| Admin | Administrator |
| amt | amount |
| ASP | application service provider - server on a network |
| API | application program interface |
| app | approve, such as the application of a quality token to approve the quality of on-line content |
| ave | average, a mathematical function or result |
| bd | board |
| cat | category |
| CD-RW | compact disk drive with read/write feature for CD disk |
| comm. | communications, typically telecommunications |
| cmd | command |
| cmt | comment, such a posting a comment related to on-line posted content |
| cnt | content |
| comm'n | commission as in sales commission |
| cpm | 1000 consumer or viewer impressions or views on a web page, "m" is "mil" for 1,000 |
| CPU | central processing unit |
| crd | card, as in debit card or credit card |

-continued

Abbreviations Table

| | |
|---|---|
| cr. crd. | credit card |
| db | database |
| decr | decrement or reduce in value |
| disp | display or code |
| doc | document |
| dr | drive, e.g., computer hard drive |
| descrpt | description |
| earn | earnings, usually estimated earnings |
| equip | equipment |
| ent | entertainment |
| ex | example |
| fin | financial as in bank, brokerage |
| fin inst | financial institution |
| freq | frequency |
| fnc | function, as in system function |
| geo | geographic location or code |
| gen | general |
| hist | historic as in historic session records |
| id'd | identified or earlier input into the system as being associated with the listed item |
| I/O | input/output |
| IP | Internet Protocol such as IP address |
| incr | increase or increment |
| loc | location |
| mem | memory |
| mess | message as in SMS or text message |
| obj | object, for example, a data object |
| pgm | program |
| Pro | provider, such as provider of content |
| P/W | password |
| pg | web page |
| pp impress | per page impression or view |
| pix | picture, usually digital picture or image |
| pmt | payment |
| Q | quantity |
| QA | quality approved token or marker, such as a User placing a QA token for on-line content posted by a Content Provider |
| qual | quality such as a QA token or marker |
| rcd | database record or record profile |
| re | regarding or relating to |
| reg'd | registered as in reg'd user |
| reg | registered as in reg user |
| rel | relevancy or relevant |
| req | request |
| rev | review |
| rpt | Report |
| sch | search |
| sel | select or selector |
| sys | system |
| sess | session |
| t | time |
| txt | text |
| tele-com | telecommunications system or network |
| thres | threshold, or a fixed valve which, when reached by the identified quantity, triggers another event |
| tot | total |
| URL | Uniform Resource Locator, x pointer, or other network locator |
| vid | video |

Persons of ordinary skill in the art recognize that the users of the method and system employ respective computers or computing devices such as personal data assistants or Internet enabled cell phones to upload content to the operating system. See FIG. 1, content upload 12, user sign-on 10 and the content filter 20 on server system 10, compiler 40 and web page data base 34 all on the server system 10 operated by the system operator. A global telecommunications system or Internet 221 in FIG. 8 enables communication and data transport between a plurality of relatively independent computer systems or computer enabled devices operated by the users. As known, a client-based user computer system includes a monitor or display unit for browser 212 to see the content to be uploaded, an input device or keypad used to issue commands and add textual content to be uploaded to the system, sometimes a command or input device—mouse, and the server system 10 (FIG. 1) has a central processor unit operative with the data base 24. The processor unit operates with a memory and an input/output or I/O device or module. It should be appreciated that the memory represents many types of data storage including hard drives, volatile and non-volatile memory, and removable drives. Also, the I/O represents a plurality of input/output devices which are utilized to couple items which are peripheral to processing unit. The I/O is connected to Internet 221. At the system, a computer is designated as an administrative computer which assists in the overall control and operation of the system and the method described herein. User computers are client computer systems 211 operated by users who upload data via the Internet 221. Third party computing systems 213, 217 are connected to Internet 221 and ultimately to system 223 which operates the method described herein. Other computer servers 247, 249, 251 publish previews via Internet 221.

In a preferred embodiment, the system 10,223 and method are deployed on Internet 221 (FIG. 8) via computer system server 223. The server system includes a CPU, memory units and an I/O and is coupled to Internet 221.

In a preferred embodiment, uploaded content or user visits to the server system 223 are obtained by utilizing a web browser 212 or other type of interface on a user's computer 211 (a client computer) as deployed by server system 223. The information obtained by computer sever system 223 is generally stored in server memory. See, for example, data base 24. Thereafter, the information is processed by server system 223 and the output information representing processed data is delivered to the user computer 211 via Internet 221 or to other web sites or publishers 247, 249, 251, via Internet 221.

Discussion of Hardware and Software Implementation Options

The present invention could be produced in hardware or software, or in a combination of hardware and software, and these implementations would be known to one of ordinary skill in the art. See relevancy engine 232 and the process in FIG. 4. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as a local area network (LAN) or widely distributed network (WAN) over a telecommunications system (such as the Internet) as would be known to a person of ordinary skill in the art.

According to the inventive principles as disclosed in connection with the preferred embodiments, the invention and the inventive principles are not limited to any particular kind of computer system but may be used with any general purpose computer, as would be known to a person of ordinary skill in the art, arranged to perform the functions described and the method steps described herein. The operations of such a computer, as described above, may be according to a computer program contained on a medium for use in the operation or control of the computer, as would be known to person of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM or other optical memory storage devices, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The claims appended hereto are meant to cover modifications and changes within the spirit and scope of the present invention.

What is claimed is:

1. A method of sharing revenue with a content provider supplying electronic content wherein some electronic content is directly supplied by said content provider and some is preexisting provider controlled content from various third party content web sites and wherein the supplied electronic content is merged into a web page with advertisements relevant to said content and advertisements relevant to a user-visitor, said user-visitor being one user of a plurality of registered users and non-registered users who view the merged web page comprising:

maintaining a plurality of web pages;

maintaining access to a plurality of ads, said ads being content or user related advertisements, each ad having content or user ad relational data associated therewith and a respective ad display and hyperlink to a corresponding advertiser designated web site;

accepting and uploading, as supplied electronic content, both direct supplied content and preexisting content from said third party content web sites;

determining from the supplied electronic content and said user-visitor one or more content or user relevancy factors related to one or more of:

the supplied content, the content provider, a predetermined user profile for said content provider, a predetermined user group profile for said content provider, and a referral source for said content provider;

a user-visitor session history;

a predetermined user-visitor profile;

a predetermined user-visitor group profile; and a referral source for said user-visitor;

matching the determined relevancy factors with said ad relational data;

merging one web page with said supplied electronic content, one or more ads having matching relevancy factors and ad relational data, wherein the matching ads have respective ad displays and corresponding hyperlinks; and publishing the merged web page on the Internet at an assigned Internet address;

tracking associated sales referral fees made via a user-visitor selected ad display and hyperlink from the merged web page;
sharing said associated sales referral fees with said content provider based upon a predetermined formula accounting for one or more of:
the supplied content,
a gross value of said associated sales referral fees set by said corresponding advertiser designated web site,
a frequency of posting other content supplied by said content provider,
a predetermined user-visitor profile,
a predetermined user-visitor group profile,
a user-visitor referral source,
the number of user-visitors who go to the published web page with the supplied content,
a time of visit factor, per visit or an aggregate thereof, for each user-visitor who goes to the published web page with the supplied content,
a frequency of return to the published web page with the supplied content for each user-visitor who returns to the published web page with the supplied content,
the shared sales referral fees transferred to one payment processor from the group of processors including:
a debit card account maintained by a financial institution;
a credit card account maintained by a financial institution;
a cell phone account maintained by a telecommunications institution;
an Internet-based payment processor;
a micropayment processor; and
a virtual currency processor;
a plurality of registered user-visitors each have a predetermined number of quality tokens which tokens can be posted in conjunction with the supplied content on said merged web page as an indicia of quality for the content;
sharing said associated sales referral fees with some or all of registered user-visitors who post quality tokens on quality branded content based upon a predetermined quality ranking formula accounting for one or more of:
a quantity of posted tokens on branded content,
a frequency of posting quality tokens on all branded content,
a gross value of said associated sales referral fees set by said corresponding advertiser designated web site,
a sequential order of posting, by registered user-visitors, of quality tokens on branded content,
a predetermined registered user-visitor profile,
a predetermined registered user-visitor group profile,
the shared sales referral fee for said content provider who supplied the branded content,
the number of user-visitors who go to the published web page with the supplied content,
a time of visit factor, per visit or an aggregate thereof, for each user-visitor who goes to the published web page with the supplied content,
a frequency of return to the published web page with the supplied content for each user-visitor who returns to the published web page with the supplied content.

2. A method of sharing revenue with a content provider as claimed in claim 1 wherein
the shared registered user-visitor sales referral fees transferred to one payment processor from the group of processors including:
a debit card account maintained by a financial institution;
a credit card account maintained by a financial institution;
a cell phone account maintained by a telecommunications institution;
an Internet-based payment processor;
a micropayment processor; and
a virtual currency processor.

3. A method of sharing revenue with a content provider as claimed in claim 2 wherein said content provider or one of said registered user-visitors is designated as a transferor and the method includes transferring the shared sales referral fees from said transferor to one of another registered user-visitor or another content provider.

4. A method of sharing revenue with a content provider as claimed in claim 2 wherein said content provider or one of said registered user-visitors is designated as a charitable transferor and the method includes transferring the shared sales referral fees from said charitable transferor to a designated charity, designated by one or more registered user-visitors or one or more content providers.

5. A method of sharing revenue with a content provider as claimed in claim 2 wherein the sharing said associated sales referral fees with some or all of registered user-visitors who post quality tokens is based upon the length of time posted tokens remain on the content of the merged web page.

6. A method of sharing revenue with a content provider as claimed in claim 1 including:
incentivizing registered user-visitors by providing each registered user-visitor with a predetermined quantity of quality ranking tokens, by
sharing said associated sales referral fees with some or all of registered user-visitors who post quality tokens in conjunction with content on said merged web page based upon a predetermined quality ranking formula.

7. A method of sharing revenue with a content provider as claimed in claim 6 wherein said predetermined quality ranking formula accounts for the quantity of posted tokens, the sequential order of posting and the number of user-visitors who go to the published web page with the supplied content, and the shared sales referral fee for said content provider who supplied the content subject to the posted quality tokens.

8. A method of sharing revenue with a content provider as claimed in claim 2 wherein said predetermined quality ranking formula accounts for the quantity of posted tokens, the sequential order of posting and the number of user-visitors who go to the published web page with the supplied content, and the shared sales referral fee for said content provider who supplied the content subject to the posted quality tokens.

9. A method of sharing revenue with a content provider as claimed in claim 8 wherein said content provider or one of said registered user-visitors is designated as a transferor and the method includes transferring the shared sales referral fees from said transferor to one of another registered user-visitor or another content provider.

10. A method of sharing revenue with a content provider as claimed in claim 9 wherein said content provider or one of said registered user-visitors is designated as a charitable transferor and the method includes transferring the shared sales referral fees from said charitable transferor to a designated charity, designated by one or more registered user-visitors or one or more content providers.

11. A method of sharing revenue with a content provider as claimed in claim 10 wherein the sharing said associated sales referral fees with some or all of registered user-visitors who post quality tokens is based upon the length of time posted tokens remain on the content of the merged web page.

12. A method of sharing revenue with a content provider as claimed in claim 1 wherein the transfer to said one payment processor is subject to a transaction fee and predetermined monetary thresholds.

13. A method of sharing revenue with a content provider as claimed in claim 11 wherein the transfer to said one payment processor is subject to a transaction fee and predetermined monetary thresholds.

14. A method of sharing revenue with a content provider supplying electronic content wherein some electronic content is directly supplied by said content provider and some is preexisting provider controlled content from various third party content web sites and wherein the supplied electronic content is merged into a web page with advertisements relevant to said content and advertisements relevant to a user-visitor, said user-visitor being one user of a plurality of registered users and non-registered users who view the merged web page comprising:
   maintaining a plurality of web pages;
   maintaining access to a plurality of ads, said ads being content or user related advertisements, each ad having content or user ad relational data associated therewith and a respective ad display and hyperlink to a corresponding advertiser designated web site;
   accepting and uploading, as supplied electronic content, both direct supplied content and preexisting content from said third party content web sites;
   determining from the supplied electronic content and said user-visitor one or more content or user relevancy factors related to one or more of:
      the supplied content,
      the content provider,
      a predetermined user profile for said content provider,
      a predetermined user group profile for said content provider, and
      a referral source for said content provider;
      a user-visitor session history;
      a predetermined user-visitor profile;
      a predetermined user-visitor group profile; and
      a referral source for said user-visitor;
   matching the determined relevancy factors with said ad relational data;
   merging one web page with said supplied electronic content, one or more ads having matching relevancy factors and ad relational data, wherein the matching ads have respective ad displays and corresponding hyperlinks; and
   publishing the merged web page on the Internet at an assigned Internet address;
   tracking associated sales referral fees made via a user-visitor selected ad display and hyperlink from the merged web page;
   incentivizing the content provider who supplied content to the merged web page by sharing said associated sales referral fees with said content provider based upon a predetermined formula accounting for a frequency of posting other content supplied by said content provider, quality rankings posted by registered user-visitors, a gross value of said associated sales referral fees set by said corresponding advertiser designated web site, and the number of user-visitors who go to the published web page with the supplied content;
   incentivizing registered user-visitors by providing each registered user-visitor with a predetermined quantity of quality ranking tokens, by sharing said associated sales referral fees with some or all of registered user-visitors who post quality tokens in conjunction with content on said merged web page based upon a predetermined quality ranking formula accounting for the quantity of posted tokens, the sequential order of posting and the number of user-visitors who go to the published web page with the supplied content, and the shared sales referral fee for said content provider who supplied the content subject to the posted quality tokens;
   the shared sales referral fees transferred, under the control of the incentivized content provider or incentivized registered user-visitors, to one payment processor from the group of processors, designated by said respective incentivized content providers or registered user-visitors, including:
      a debit card account maintained by a financial institution;
      a credit card account maintained by a financial institution;
      a cell phone account maintained by a telecommunications institution;
      an Internet-based payment processor;
      a micropayment processor; and
      a virtual currency processor;
      wherein the sharing said associated sales referral fees with said content provider and some or all of registered user-visitors who post quality tokens is based upon the length of time posted tokens remain on the content of the merged web page.

15. A method of sharing revenue with a content provider as claimed in claim 14 wherein said content provider or one of said registered user-visitors is designated as a transferor and the method includes transferring a designated portion of the shared sales referral fees from said transferor to one of another registered user-visitor or another content provider.

16. A method of sharing revenue with a content provider as claimed in claim 15 wherein said content provider or one of said registered user-visitors is designated as a charitable transferor and the method includes transferring a designated charitable portion of the shared sales referral fees from said charitable transferor to a designated charity, designated by one or more registered user-visitors or one or more content providers.

17. A method of sharing revenue with a content provider as claimed in claim 16 wherein the transfer to said one payment processor is subject to a transaction fee and predetermined monetary thresholds.

18. A method of sharing revenue with a content provider as claimed in claim 14 wherein the transfer to said one payment processor is subject to a transaction fee and predetermined monetary thresholds.

19. A method of sharing revenue with a content provider supplying electronic content wherein some electronic content is directly supplied by said content provider and some is preexisting provider controlled content from various third party content web sites and wherein the supplied electronic content is merged into a web page with advertisements relevant to said content and advertisements relevant to a user-visitor, each ad having a respective ad display and hyperlink to a corresponding advertiser designated web site, said user-visitor being one user of a plurality of registered users and non-registered users who view the merged web page comprising:
   publishing a web page with said supplied electronic content and one or more ads having respective ad displays and corresponding hyperlinks on the Internet at an assigned Internet address;
   tracking associated sales referral fees made via a user-visitor selected ad display and hyperlink from the published web page;
   incentivizing the content provider who supplied content to the published web page by sharing said associated sales referral fees with said content provider based upon a predetermined formula accounting for a frequency of posting other content supplied by said content provider, quality rankings posted by registered user-visitors, a gross value of said associated sales referral fees set by said corresponding advertiser designated web site, and the number of user-visitors who go to the published web page with the supplied content;

incentivizing registered user-visitors by providing each registered user-visitor with a predetermined quantity of quality ranking tokens, by sharing said associated sales referral fees with some or all of registered user-visitors who post quality tokens in conjunction with content on said published web page based upon a predetermined quality ranking formula accounting for the quantity of posted tokens, the sequential order of posting and the number of user-visitors who go to the published web page with the supplied content, and the shared sales referral fee for said content provider who supplied the content subject to the posted quality tokens;

the shared sales referral fees transferred, under the control of the incentivized content provider or incentivized registered user-visitors, to one payment processor from the group of processors, designated by said respective incentivized content providers or registered user-visitors, including:

a debit card account maintained by a financial institution;

a credit card account maintained by a financial institution;

a cell phone account maintained by a telecommunications institution;

an Internet-based payment processor;

a micropayment processor; and a virtual currency processor;

wherein the sharing said associated sales referral fees with said content provider and some or all of registered user-visitors who post quality tokens is based upon the length of time posted tokens remain on the content of the published web page.

20. A method of sharing revenue with a content provider as claimed in claim 19 wherein said content provider or one of said registered user-visitors is designated as a transferor and the method includes transferring a designated portion of the shared sales referral fees from said transferor to one of another registered user-visitor or another content provider.

21. A method of sharing revenue with a content provider as claimed in claim 20 wherein said content provider or one of said registered user-visitors is designated as a charitable transferor and the method includes transferring a designated charitable portion of the shared sales referral fees from said charitable transferor to a designated charity, designated by one or more registered user-visitors or one or more content providers.

22. A method of sharing revenue with a content provider as claimed in claim 21 wherein the transfer to said one payment processor is subject to a transaction fee and predetermined monetary thresholds.

23. A method of sharing revenue with a content provider as claimed in claim 19 wherein the transfer to said one payment processor is subject to a transaction fee and predetermined monetary thresholds.

24. A non-transitory computer readable medium containing programming instructions stored thereon for sharing revenue with a content provider supplying electronic content wherein some electronic content is directly supplied by said content provider and some is preexisting provider controlled content from various third party content web sites and wherein the supplied electronic content is merged into a web page with advertisements relevant to said content and advertisements relevant to a user-visitor, each ad having a respective ad display and hyperlink to a corresponding advertiser designated web site, said user-visitor being one user of a plurality of registered users and non-registered users who view the merged web page, the programming instructions comprising:

publishing a web page with said supplied electronic content and one or more ads having respective ad displays and corresponding hyperlinks on the Internet at an assigned Internet address;

tracking associated sales referral fees made via a user-visitor selected ad display and hyperlink from the published web page;

incentivizing the content provider who supplied content to the published web page by sharing said associated sales referral fees with said content provider based upon a predetermined formula accounting for a frequency of posting other content supplied by said content provider, quality rankings posted by registered user-visitors, a gross value of said associated sales referral fees set by said corresponding advertiser designated web site, and the number of user-visitors who go to the published web page with the supplied content;

incentivizing registered user-visitors by providing each registered user-visitor with a predetermined quantity of quality ranking tokens, by sharing said associated sales referral fees with some or all of registered user-visitors who post quality tokens in conjunction with content on said published web page based upon a predetermined quality ranking formula accounting for the quantity of posted tokens, the sequential order of posting and the number of user-visitors who go to the published web page with the supplied content, and the shared sales referral fee for said content provider who supplied the content subject to the posted quality tokens;

the shared sales referral fees transferred, under the control of the incentivized content provider or incentivized registered user-visitors, to one payment processor from the group of processors, designated by said respective incentivized content providers or registered user-visitors, including:

a debit card account maintained by a financial institution;

a credit card account maintained by a financial institution;

a cell phone account maintained by a telecommunications institution;

an Internet-based payment processor;

a micropayment processor; and a virtual currency processor;

wherein the sharing said associated sales referral fees with said content provider and some or all of registered user-visitors who post quality tokens is based upon the length of time posted tokens remain on the content of the published web page.

25. A non-transitory computer readable medium containing programming instructions stored thereon for sharing revenue with a content provider as claimed in claim 24 wherein said content provider or one of said registered user-visitors is designated as a transferor and the program includes transferring a designated portion of the shared sales referral fees from said transferor to one of another registered user-visitor or another content provider.

26. A non-transitory computer readable medium containing programming instructions stored thereon for sharing revenue with a content provider as claimed in claim 25 wherein said content provider or one of said registered user-visitors is designated as a charitable transferor and the program includes transferring a designated charitable portion of the shared sales referral fees from said charitable transferor to a designated charity, designated by one or more registered user-visitors or one or more content providers.

27. A non-transitory computer readable medium containing programming instructions stored thereon for sharing revenue with a content provider as claimed in claim 26 wherein the transfer to said one payment processor is subject to a transaction fee and predetermined monetary thresholds.

28. A non-transitory computer readable medium containing programming instructions stored thereon for sharing revenue with a content provider as claimed in claim 24 wherein the transfer to said one payment processor is subject to a transaction fee and predetermined monetary thresholds.

29. An information processing system for sharing revenue with a content provider supplying electronic content wherein some electronic content is directly supplied by said content provider and some is preexisting provider controlled content from various third party content web sites and wherein the supplied electronic content is merged into a web page with advertisements relevant to said content and advertisements relevant to a user-visitor, each ad having a respective ad display and hyperlink to a corresponding advertiser designated web site, said user-visitor being one user of a plurality of registered users and non-registered users who view the merged web page, the system comprising:

a publisher, coupled to the Internet, publishing a web page with said supplied electronic content and one or more ads having respective ad displays and corresponding hyperlinks on the Internet at an assigned Internet address;

an associated sales referral fee tracker operatively coupled to the published web page with ads and hyperlinks, the tracker monitoring a user-visitor selected ad display and hyperlink from the published web page;

a first fee sharing module, coupled to said sales referral fee tracker, incentivizing the content provider who supplied content to the published web page by sharing said associated sales referral fees with said content provider based upon a predetermined formula accounting for a frequency of posting other content supplied by said content provider, quality rankings posted by registered user-visitors, a gross value of said associated sales referral fees set by said corresponding advertiser designated web site, and the number of user-visitors who go to the published web page with the supplied content;

a second fee sharing module, coupled to said sales referral fee tracker, incentivizing registered user-visitors by providing each registered user-visitor with a predetermined quantity of quality ranking tokens, by sharing said associated sales referral fees with some or all of registered user-visitors who post quality tokens in conjunction with content on said published web page based upon a predetermined quality ranking formula accounting for the quantity of posted tokens, the sequential order of posting and the number of user-visitors who go to the published web page with the supplied content, and the shared sales referral fee for said content provider who supplied the content subject to the posted quality tokens;

a payment transfer module for the shared sales referral fees, said transfer module transferring, under the control of the incentivized content provider or incentivized registered user-visitors, shared associated sales referral fees to one payment processor from the group of processors, designated by said respective incentivized content providers or registered user-visitors, including:

a debit card payment processor maintained by a financial institution;

a credit card payment processor maintained by a financial institution;

a cell phone payment processor maintained by a telecommunications institution;

an Internet-based payment processor;

a micropayment payment processor; and a virtual currency payment processor.

30. An information processing system for sharing revenue with a content provider as claimed in claim 29 wherein said content provider or one of said registered user-visitors is designated as a transferor and the system includes a fee transfer module for transferring a designated portion of the shared sales referral fees from said transferor to one of another registered user-visitor or another content provider.

31. An information processing system for sharing revenue with a content provider as claimed in claim 30 wherein said content provider or one of said registered user-visitors is designated as a charitable transferor and the system includes a charity fee transfer module for transferring a designated charitable portion of the shared sales referral fees from said charitable transferor to a designated charity, designated by one or more registered user-visitors or one or more content providers.

32. An information processing system for sharing revenue with a content provider as claimed in claim 31 wherein the first and second fee sharing module monitors the length of time posted tokens remain on the content of the published web page and adjusts the shared associated sales referral fees with said content provider and some or all of registered user-visitors who post quality tokens on the content of the published web page.

33. An information processing system for sharing revenue with a content provider as claimed in claim 32 wherein the payment transfer module applies a transaction fee and predetermined monetary thresholds to transfers.

34. An information processing system for sharing revenue with a content provider as claimed in claim 29 wherein the payment transfer module applies a transaction fee and predetermined monetary thresholds to transfers.

* * * * *